US010219285B2

(12) United States Patent
Nabetani et al.

(10) Patent No.: US 10,219,285 B2
(45) Date of Patent: Feb. 26, 2019

(54) WIRELESS COMMUNICATION DEVICE AND METHOD FOR DETERMINING TRANSMISSION RATE BASED ON INTERFERENCE AMOUNT INFORMATION

(71) Applicant: KABUSHIKI KAISHA TOSHIBA, Minato-ku, Tokyo (JP)

(72) Inventors: Toshihisa Nabetani, Kanagawa (JP); Haruka Obata, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 44 days.

(21) Appl. No.: 15/420,783

(22) Filed: Jan. 31, 2017

(65) Prior Publication Data

US 2017/0273092 A1    Sep. 21, 2017

(30) Foreign Application Priority Data

Mar. 15, 2016 (JP) ................................ 2016-051526

(51) Int. Cl.
*H04L 12/28* (2006.01)
*H04W 72/08* (2009.01)
(Continued)

(52) U.S. Cl.
CPC ........ *H04W 72/085* (2013.01); *H04B 7/0452* (2013.01); *H04W 24/08* (2013.01); *H04W 72/042* (2013.01)

(58) Field of Classification Search
USPC ................. 370/252, 278, 329, 430
See application file for complete search history.

(56) References Cited

U.S. PATENT DOCUMENTS

| 2005/0197162 A1* | 9/2005 | Fujishima | H04B 7/0408 |
| | | | 455/562.1 |
| 2009/0016263 A1* | 1/2009 | Kishigami | H04B 7/04 |
| | | | 370/328 |

(Continued)

FOREIGN PATENT DOCUMENTS

| JP | 2013-172340 A | 9/2013 |
| JP | 2014-165770 A | 9/2014 |

OTHER PUBLICATIONS

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

(Continued)

*Primary Examiner* — John Pezzlo
(74) *Attorney, Agent, or Firm* — Foley & Lardner LLP

(57) ABSTRACT

According to one embodiment, a wireless communication device includes: a receiver configured to receive a first frame from a first terminal and a second frame from a second terminal; and controlling circuitry configured to obtain quality information of a first channel with the first terminal based on the first frame and quality information of a second channel with the second terminal based on the second frame, and determine a transmission rate applied to the first terminal and a transmission rate applied to the second terminal in spatially multiplexed transmission, based on the quality information of the first channel, the quality information of the second channel and interference amount information being indicative of an amount of interference depending on an execution condition of the spatially multiplexed transmission.

12 Claims, 16 Drawing Sheets

(51) Int. Cl.
H04W 72/04 (2009.01)
H04B 7/0452 (2017.01)
H04W 24/08 (2009.01)
H04J 1/16 (2006.01)

(56) References Cited

U.S. PATENT DOCUMENTS

2015/0016291 A1* 1/2015 Kim .................. H04L 1/0026
                                                370/252
2015/0124681 A1* 5/2015 Zhou .................. H04M 3/567
                                                370/312

OTHER PUBLICATIONS

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.
Stacey, Robert: "Specification Framework for TGax", IEEE 11-15-0132-15-00ax-spec-framework, Intel, Jan. 2016, pp. 1-43.
Stacey, Robert: "Specification Framework for TGax", IEEE 11-15-0132-17-00ax-spec-framework, Intel, May 2016, pp. 1-61.

* cited by examiner

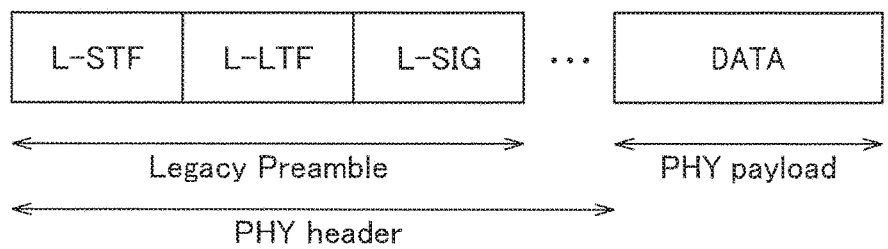
FIG. 6
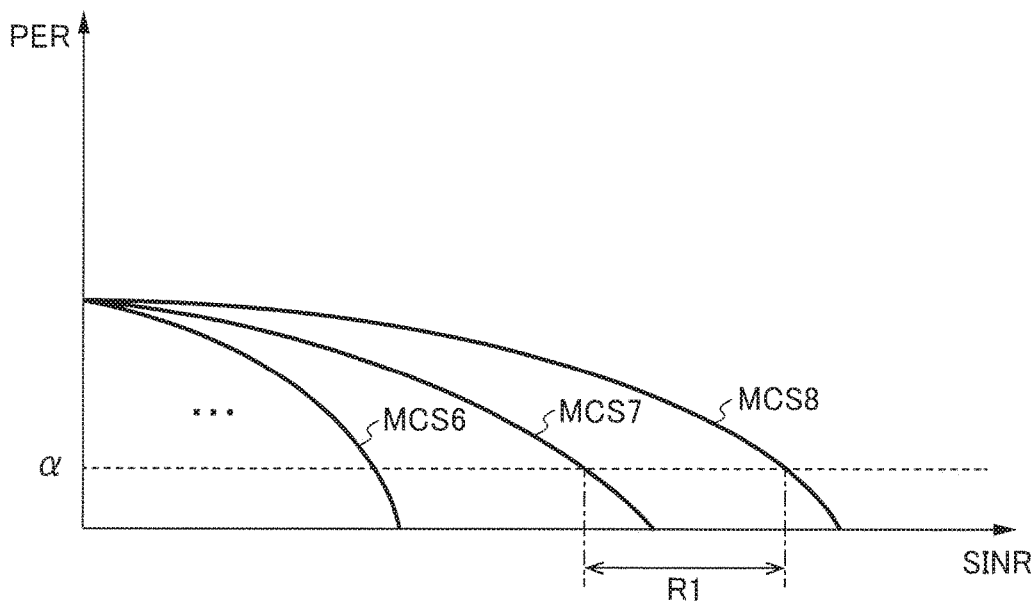
FIG. 7
| SINR | MCS |
|---|---|
| ... | ... |
| $\beta 6 \sim \beta 7$ | MCS6 |
| $\beta 7 \sim \beta 8$ | MCS7 |
| $\beta 8 \sim \beta 9$ | MCS8 |
FIG. 8

| SPATIAL MULTIPLEXING NUMBER | AGING TIME [ms] | INTER-USER INTERFERENCE AMOUNT [dB] |
|---|---|---|
| 2 | 0 | ... |
| | 1 | ... |
| | 2 | ... |
| | ... | ... |
| 3 | 0 | ... |
| | 1 | ... |
| | 2 | ... |
| | ... | ... |
| 4 | 0 | ... |
| | 1 | ... |
| | 2 | ... |
| | ... | ... |

| SPATIAL MULTIPLEXING NUMBER | AGING TIME [ms] | INTER-USER INTERFERENCE AMOUNT [dB] |
|---|---|---|
| 2 | ... | ... |
| 3 | 0 | ... |
|   | 1 | ... |
|   | 2~4 | ... |
|   | 5~10 | ... |
|   | 11~16 | ... |
|   | ... | ... |
|   | 100~110 | ... |
|   | ... | ... |
|   | 400~500 | ... |
|   | ... | ... |
| 4 | ... | ... |

FIG. 13

| SPATIAL MULTIPLEXING NUMBER | INTER-USER INTERFERENCE AMOUNT [dB] |
|---|---|
| 2 | ... |
| 3 | ... |
| 4 | ... |

FIG. 14

| AGING TIME [ms] | INTER-USER INTERFERENCE AMOUNT [dB] |
|---|---|
| 0 | ... |
| 1 | ... |
| 2 | ... |
| 3 | ... |
| 4 | ... |
| 5 | ... |
| 6 | ... |
| ... | ... |
| 100 | ... |
| ... | ... |
| 200 | ... |
| ... | ... |

FIG. 15

| SPATIAL MULTIPLEXING NUMBER | AGING TIME [ms] | INTER-USER INTERFERENCE AMOUNT [dB] |
|---|---|---|
| 2 | 0 | ... |
| | 1 | ... |
| | 2 | ... |
| | ... | ... |
| 3 | 0 | ... |
| | 1 | ... |
| | 2 | ... |
| | ... | ... |
| 4 | 0 | ... |
| | 1 | ... |
| | 2 | ... |
| | ... | ... |

(A) INDOOR

| SPATIAL MULTIPLEXING NUMBER | AGING TIME [ms] | INTER-USER INTERFERENCE AMOUNT [dB] |
|---|---|---|
| 2 | 0 | ... |
| | 1 | ... |
| | 2 | ... |
| | ... | ... |
| 3 | 0 | ... |
| | 1 | ... |
| | 2 | ... |
| | ... | ... |
| 4 | 0 | ... |
| | 1 | ... |
| | 2 | ... |
| | ... | ... |

(B) OUTDOOR

FIG. 16

WIRELESS COMMUNICATION DEVICE AND METHOD FOR DETERMINING TRANSMISSION RATE BASED ON INTERFERENCE AMOUNT INFORMATION

CROSS REFERENCE TO RELATED APPLICATIONS

This application is based upon and claims the benefit of priority from the prior Japanese Patent Application No. 2016-051526, filed on Mar. 15, 2016, the entire contents of which are incorporated herein by reference.

FIELD

Embodiments of the present invention relate to a wireless communication device and a wireless communication method.

BACKGROUND

IEEE802.11ac is a wireless local area network (LAN) standard and defines a downlink multi-user multiple input multiple output (DL-MU-MIMO) transmission scheme. DL-MU-MIMO uses a technique called "beamforming" and carries out spatially multiplexed transmission by forming spatially orthogonal beams for multiple terminals. The individual terminals eligible for DL-MU-MIMO may be called "users." As the method for an access point to select multiple terminals to carry out DL-MU-MIMO transmission, there is a method according to which a combination of terminals having a small spatial correlation (inter-user interference) is selected. Also, according to an existing method, a combination of terminals having small difference in frame length of the frames to be transmitted is selected considering the spatial multiplexing efficiency.

The frame lengths of the terminals can be calculated based on the size of the frame and the transmission rate (MCS: Modulation and Coding Scheme) used in transmission of the frames. The MCSs necessary for transmission to the terminals are in normal cases selected based on the SINRs of the respective terminals (Signal-to-Interference Noise Ratio).

However, the inter-user interference amounts of respective combinations of terminals in MU-MIMO differs from each other, so that it is necessary to calculate the inter-user interference amounts (SINR) for each candidate of combination in order to select the MCSs for transmission. In the calculation of the SINR, in normal cases, matrix operation is carried out using a channel matrix. As the number of the combination candidates becomes larger, the calculation amount of the matrix operation also becomes larger, causing increase in the calculation amount of the user selection scheduling.

BRIEF DESCRIPTION OF THE DRAWINGS

FIG. 6 is a diagram illustrating an example configuration of a physical packet;

FIG. 7 is a diagram for explanation of a relationship between signal-to-interference noise ratio (SINR) and packet error rate (PER);

FIG. 8 is a diagram illustrating a table of SINR and modulation and coding scheme (MCS);

FIG. 13 is a diagram illustrating a table of multiplexing number, channel aging time, and inter-user interference amount;

FIG. 14 is a diagram illustrating a table of multiplexing number and inter-user interference amount;

FIG. 15 is a diagram illustrating a table of channel aging time and inter-user interference amount;

FIG. 16 is a diagram illustrating tables of different uses;

DETAILED DESCRIPTION

According to one embodiment, a wireless communication device includes: a receiver configured to receive a first frame from a first terminal and a second frame from a second terminal; and controlling circuitry configured to obtain quality information of a first channel with the first terminal based on the first frame and quality information of a second channel with the second terminal based on the second frame, and determine a transmission rate applied to the first terminal and a transmission rate applied to the second terminal in spatially multiplexed transmission, based on the quality information of the first channel, the quality information of the second channel and interference amount information being indicative of an amount of interference depending on an execution condition of the spatially multiplexed transmission.

Hereinafter, embodiments of the present invention will be described with reference to the drawings. The entire contents of IEEE Std 802.11™-2012 and IEEE Std 802.11ac™-2013, known as the wireless LAN specification are herein incorporated by reference in the present specification.

First Embodiment

Figure 1:
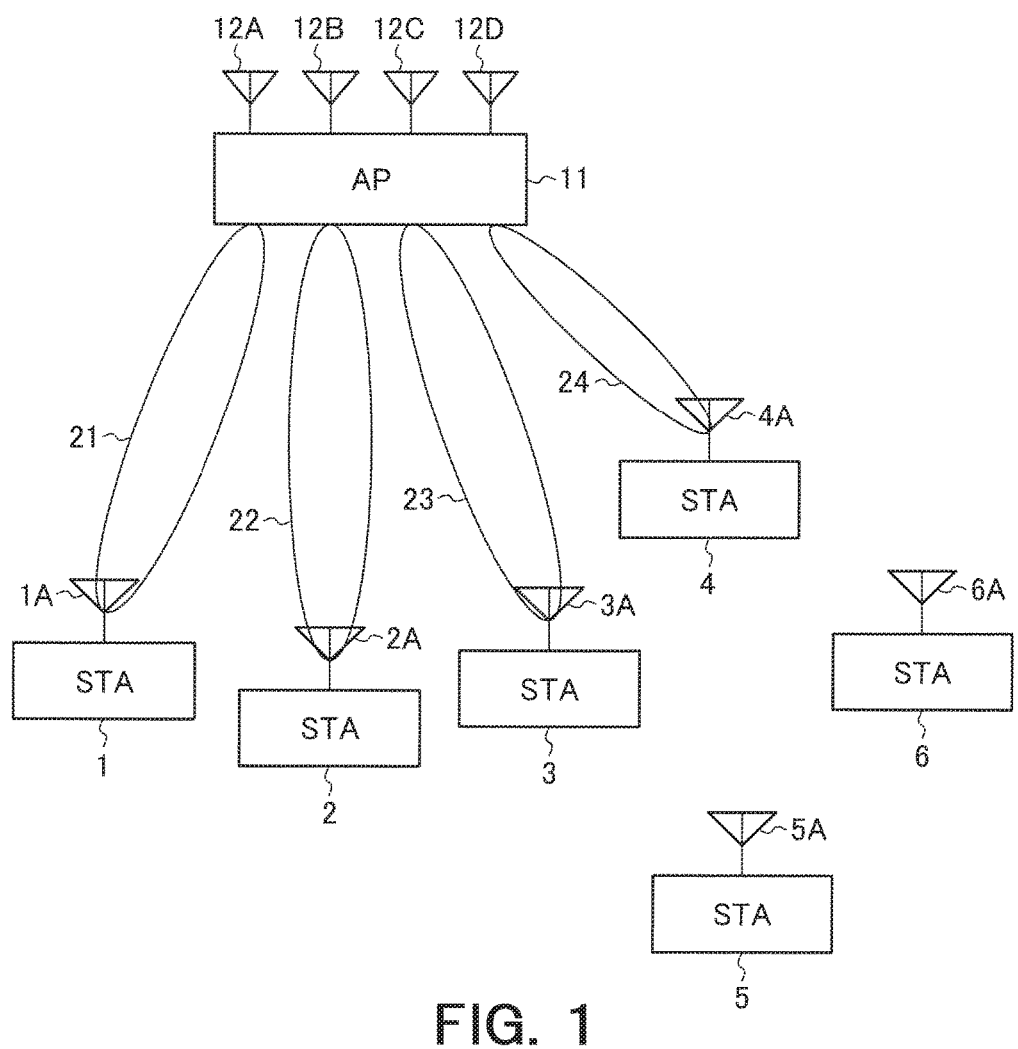
FIG. 1 is a diagram illustrating a wireless communication system in accordance with a first embodiment.

FIG. 1 is a configuration of a wireless communication system according to the embodiment. The wireless communication system includes an access point (AP: Access Point) 11 which is a base station, and wireless communication terminals 1 to 6 which are not base stations. The wireless communication terminals may be referred to as terminals, users, wireless terminals, or stations (STA) in some cases. The access point 11 is also one form of terminal, except for having a relay function, since it has the functions of a terminal. The access point 11 and the terminals 1 to 6 wirelessly communicate with each other in accordance with any wireless communication scheme. As an example, the communication complying with the IEEE802.11 standard is carried out. A wireless communication device equipped in the terminal communicates with a wireless communication device equipped in an access point. The wireless communication device equipped in the access point communicates with the wireless communication device equipped in the terminal. A wireless LAN based on the IEEE802.11 standard is assumed for the wireless communication system in the embodiment without limitation. The IEEE802.11 standard may refer to any of IEEE802.11b, IEEE802.11a, IEEE802.11n, IEEE802.11ac, and IEEE802.11ax that is a next generation wireless LAN standard, or those other than these.

The access point 11 includes a plurality of antennas. In the example of FIG. 1, the access point 11 includes four antennas 12A, 12B, 12C, and 12D. The access point may be equipped with more or fewer antennas than those illustrated in the example of FIG. 1. The terminals 1 to 6 each include one or more antennas. In this example, the terminals 1 to 4 each include one antenna from the antennas indicated by 1A, 2A, 3A, and 4A, respectively.

The terminals 1 to 6 connect with the access point 11 to form a wireless communication system or a wireless communication group (BSS: Basic Service Set) between the terminal and the access point 11. The connection means a state where a wireless link is established, and a parameter required for the communication is completely exchanged by way of the association process with the access point so as to establish the wireless link. Each of the terminals 1 to 6 establishing the wireless link has an Association ID (AID) allocated from the access point. The AID is an identifier given in the association process which is performed between the terminal and the access point in order that the terminal belongs to the BSS of the access point. More specifically, in a case where the access point authorizes the terminal that transmitted a connection request (Association Request) frame to connect therewith, it allocates a number which is generated locally in the relevant network to the terminal. The number is what is called the AID, and a certain number in a specified range other than 0 is allocated. The AID is allocated so as to be unique in that network (BSS). The AP transmits a connection response (Association Response) frame containing the allocated AID to the terminal which is to be authorized to connect therewith. The terminal grasps its AID by reading out the AID from the connection response frame. The terminal receives the connection response frame for the connection authorization from the access point to be able to belong to the BSS formed by the access point and thereafter communicate with the access point. Such a process for connection between the access point and the terminal is called an association process. The AP may perform an authentication process before the association process with the terminal. The access point can identify the terminal connected with itself by means of the AID or a MAC address.

FIG. 2(A) illustrates the basic exemplary format of the MAC frame. A type of a frame is roughly classified into a data frame, a management frame, and a control frame and any type of the frame is based on a frame format as shown in FIG. 2(A). This frame format includes the fields of MAC header, Frame body, and FCS. The MAC header includes, as illustrated in FIG. 2(B), the fields of Frame Control, Duration/ID, Address 1, Address 2, Address 3, Sequence Control, QoS Control, and HT (High Throughput) Control.

These fields do not need to always exist and there may be cases where some of these fields do not exist. For example, there may be a case where the Address 3 field does not exist. Also, there may be other cases where both or either one of the QoS Control field and the HT Control field does not exist. Also, there may be still other cases where the frame body field does not exist. Also, any field or fields that are not illustrated in FIG. 2 may exist. For example, an Address 4 field may further exist. The HT control field can be extended to a VHT (Very High Throughput) control field in IEEE 802.11ac or an HE (High Efficient) control field in IEEE 802.11ax which is a next-generation wireless LAN standard.

The field of Address 1 indicates Receiver Address (RA), the field of Address 2 indicates Transmitter Address (TA), and the field of Address 3 indicates either BSSID (Basic Service Set IDentifier) (which may be the wildcard BSSID whose bits are all set to 1 to cover all of the BSSIDs depending on the cases) which is the identifier of the BSS, or TA, depending on the purpose of the frame.

Two fields of Type and Subtype (Subtype) or the like are set in the Frame Control field. The rough classification as to whether it is the data frame, the management frame, or the control frame is made by the Type field, and more specific types, for example, fine discrimination among the roughly classified frames, for example, as to whether it is a BA (Block Ack) frame or a BAR (Block Ack Request) frame within the control frame is made by the Subtype field.

The Duration/ID field describes the medium reserve time, and it is determined that the medium is virtually in the busy state from the end of the physical packet including this MAC frame to the medium reserve time when a MAC frame addressed to another terminal is received. The scheme of this type to virtually determine that the medium is in the busy state, or the period during which the medium is virtually regarded as being in the busy state, is, as described above, called NAV (Network Allocation Vector).

The QoS control field is used to carry out QoS control to carry out transmission with the priorities of the frames taken into account. The QoS control field includes a TID field (16 types from 0 to 15) in which an identifier is set for data traffic, and an Ack policy field in which an acknowledgement scheme is set, and the like. The confirmation of the TID field enables to identify the traffic type of the data. Moreover, the confirmation of the Ack policy field enables to determine whether the QoS Data frame is a normal Ack policy or a block Ack policy or whether the data frame has been transmitted as No Ack policy.

The HT control field is a field introduced in IEEE 802.11n. The HT (High Throughput) control field is present when the Order field is set to 1 for QoS data frame or a management frame. As stated, the HT control field can be extended to a VHT (Very High Throughput) control field in IEEE 802.11ac or an HE (High Efficient) control field in IEEE 802.11ax which is a next-generation wireless LAN standard and can provide notifications corresponding to the functions of 802.11n, 802.11ac, or 802.11ax.

Figures 2, 3:
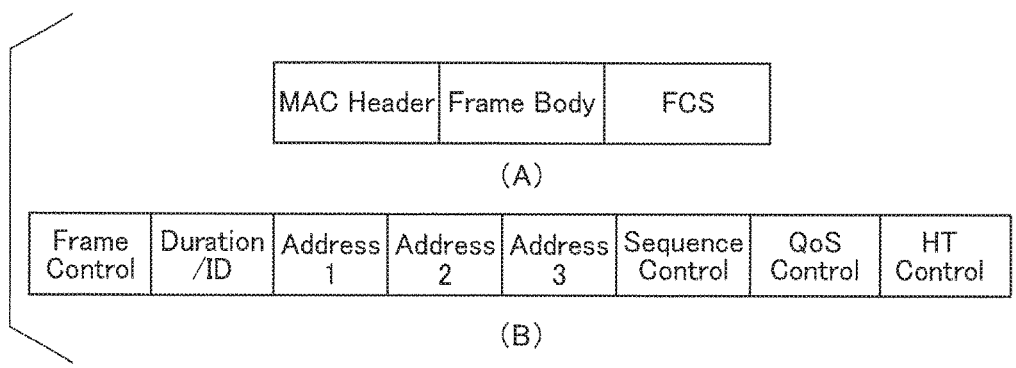
FIG. 2 is a diagram illustrating an example basic format of a MAC frame.
FIG. 3 is a diagram illustrating a format of an information element.

In the management frame, an information element (Information element; IE) to which a unique Element ID (IDentifier) is assigned is set in the Frame Body field. One or a plurality of information elements may be set in the frame body field. The information element has, as illustrated in FIG. 3, the fields of an Element ID field, a Length field, and an Information field. The information element is discriminated by the Element ID. The Information field is adapted to store the content of the information to be notified, and the Length field is adapted to store the length information of the information field. In the management frame, one or more predefined fields may be arranged depending on the frame type (Subtype) other than the information element.

Frame check sequence (FCS) information is set in the FCS field as a checksum code for use in error detection of the frame on the reception side. As an example of the FCS information, CRC (Cyclic Redundancy Code) may be mentioned.

The access point 11 is capable of transmitting a plurality of MAC frames (hereinafter referred to as "frames") to a plurality of terminals selected from the terminals 1 to 6 by a multi-user transmission scheme, in other words, capable of carrying out multiplexed transmission of the frames. As an example of the multi-user transmission scheme, the drawings illustrate a case where the frames addressed to the terminals 1 to 4 are transmitted by spatial multiplexing. Spatially multiplexed transmission refers to simultaneous transmission of a plurality of frames using the same frequency band. Specifically, the access point 11 transmits the frames addressed to the terminals 1 to 4 in accordance with downlink multi-user multi-input and multi-output (DL-MU-MIMO). DL-MU-MIMO is defined by the IEEE802.11ac standard. FIG. 1 illustrates a state where the access point 11 carries out DL-MU-MIMO with four terminals 1 to 4. The access point 11 forms spatially orthogonal beams with the terminals 1 to 4.

DL-MU-MIMO forms spatially orthogonal beams for a plurality of terminals using a technique called "beamforming." Downlink channel information (channel information) indicative of downlink channels with the respective terminals is used for the beam formation. For that purpose, the access point, by way of example, transmits in advance frames for sounding (channel estimation frames) to the respective terminals, and receives feedback of the downlink channel information measured by each terminal. Such a sequence is called "sounding." In this manner, the access point obtains the pieces of downlink channel information of the individual terminals.

The channel estimation frame includes a known signal. The terminals identify variations in amplitudes and phases on the basis of the amplitudes and phases of the actually received signals and the amplitude and phase of the known signal and provide feedback of the channel information, which indicates the variations in the amplitudes and the phases, for the access point. More specifically, the access point carries out the sounding for each of the antennas that the access point itself is equipped with, and thereby obtains, on a per-antenna basis, pieces of channel information of the terminals with respect to the respective antennas. The access point manages, for the antennas of the access point itself, the pieces of the channel information obtained from the respective terminals in the form of a channel matrix (channel matrix). The channel matrix is a matrix constituted by the amount of variations in the phases and amplitudes of the channels between the antennas of the access point (transmission antenna) and the terminals' antennas (reception antennas).

The access point uses the channel matrix and calculates weights for the respective terminals and the respective antennas so as to generate a plurality of directional beam patterns toward the respective terminals. A known method may be used for that purpose. The access point carries out weighting for the transmission signals to the terminals, on a per-antenna basis, using the weights for the respective antennas, and transmits the weighted transmission signals via the respective antennas. This operation is carried out for each of the terminals. Accordingly, multiple transmission signals to multiple terminals are simultaneously transmitted via the respective antennas. By virtue of this, it is made possible to carry out the beamforming on a per-terminal basis. The terminals each appropriately receive their respective frames addressed to them, and does not receive frames other than those addressed to themselves (in other words, the transmission signals addressed to other terminals are not received or reception thereof is restricted).

Figure 4:
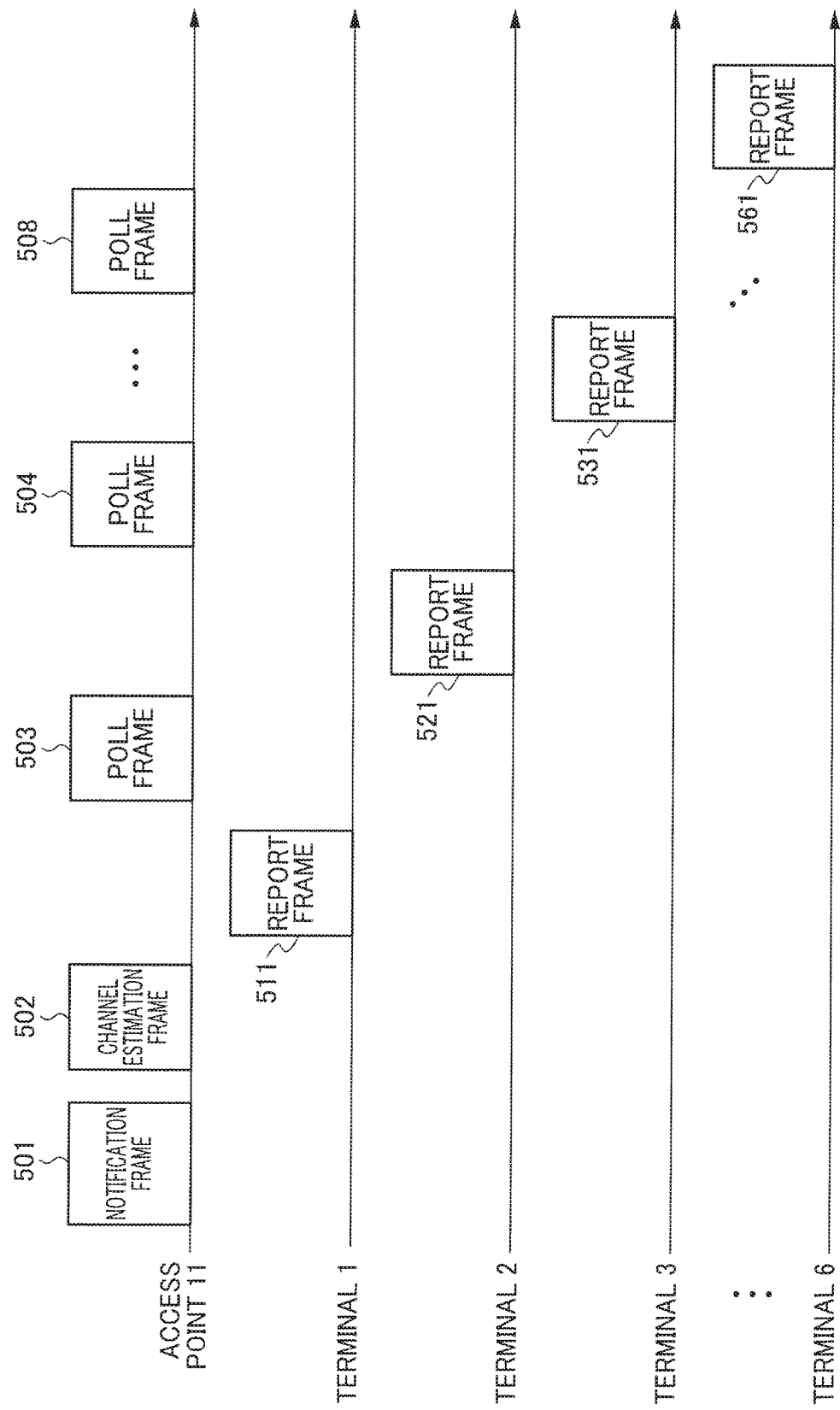
FIG. 4 is a diagram illustrating an example sequence of sounding.

FIG. 4 illustrates an example of the sounding. The signals (frames) transmitted by access point 11 and the terminals 1 to 6 are indicated by rectangles. The horizontal axes are time axes along which time elapses rightward.

The access point 11 obtains a right to access a wireless medium in accordance with CSAM/CA. Specifically, the access point 11 performs carrier sensing during a period from a randomly determined back-off time to a fixed time. When a clear channel assessment (CCA) is equal to or less than a threshold, the access point 11 determines that the wireless medium is in an idle state. As a result, the access point 11 obtains the right to access the wireless medium.

There, the fixed time period is the DIFS (Distributed coordination function InterFrame Space)/AIFS (Arbitration InterFrame Space). The DIFS/AIFS means any one of the DIFS and the AIFS. In a case of not QoS compliant the DIFS is meant, and in a case of QoS compliant the AIFS is meant which depends on an access category (AC) of the transmitted data.

The DIFS or the AIFS is an example, and another time (IFS) may be used so long as it is a predetermined time period. The DIFS, the AIFS or a SIFS (Short InterFrame Space) which are described elsewhere herein are similarly example and another time period may be used.

The access point 11 transmits notification frame 501 specifying the terminals 1 to 6 based on the obtained access right. As the notification frame 501, a VHT NDPA (Null Data Packet Announcement) frame may be used. A receiver address (RA) of the notification frame 501 is a broadcast address or a multicast address. A header or a body field of the notification frame 501 includes terminal information fields 1 to 6 that specify identification information identifying the terminals 1 to 6 (e.g., AID or MAC address, etc.).

The access point 11 transmits channel estimation frames 502 via the respective antennas upon the lapse of an SIFS (Short Inter Frame Space) after completion of transmission of the notification frame 501. As an example of the channel estimation frame 502, a null data packet (NDP) can be used. The notification frame 501 each include a known signal for the terminals to carry out the channel estimation.

When the terminals 1 to 6 have received the channel estimation frames 502, the terminals 1 to 6 each calculate downlink channel information on the basis of the corresponding one of the channel estimation frames 502. The terminal that is specified by the terminal information field at a predetermined location in the notification frame 501 transmits a report frame including the calculated downlink channel information upon the lapse of an SIFS after completion of reception of the frames 502. In this example, the terminal 1 specified by the terminal information field 1 transmits the report frame 511 including the calculated downlink channel information upon the lapse of an SIFS after completion of reception of the frames 502. As an example of the report frame 511, a VHT compressed beamforming report frame can be used.

The access point generates and transmits a poll frame, which specifies a terminal which has not yet transmitted a report frame, upon the lapse of an SIFS after completion of reception of the report frame 511. In this example, a poll frame 503 that specifies the terminal 2 is transmitted. As an example of the poll frame 503, a Beamforming Report Poll frame can be used. When the terminal 2 has received the poll frame 503, the terminal 2 transmits a report frame 521 including the downlink channel information calculated based on the channel estimation frames 502 upon the lapse of an SIFS after completion of reception of the poll frame 503. A receiver address (RA) of the poll frame is an address of the terminal to which the frame is addressed, and a transmitter address (TA) thereof is a MAC address of the access point (BSSID). A receiver address (RA) of the report frame is the MAC address of the access point (BSSID), and a transmitter address (TA) is a MAC address of the terminal from which the frame is transmitted.

Thereafter, in the same manner, the access point 11 transmits a poll frame 504 to the terminal 3 and receives a report frame 531 from the terminal 3 upon the lapse of an SIFS after completion of transmission of the poll frame 504. Thereafter transmission of a poll frame and reception of a report frame are also sequentially carried out in the same or similar manner for the terminal 4 and the terminal 5, respectively, and finally transmission of a poll frame 508 and reception of a report frame 561 is carried out for the terminal 6. In this manner, the access point 11 obtains the pieces of the downlink channel information from the respective terminals 1 to 6. It should be noted that the SIFS is only mentioned as an example and other amounts of time, i.e., interframe spaces (IFSs) may be relied upon as long as they represent a predetermined amount of time.

In the above-described sequence, the access point transmits the channel estimation frames simultaneously via the antennas while the individual terminals calculate their respective pieces of channel information with respect to the respective antennas of the access point. For that purpose, the access point specifies a plurality of pattern signals that are orthogonal to each other for the multiple channel estimation frames. The terminal that has received the frames separates the multiple channel estimation frames on the basis of the pattern signals. It is assumed here that the pattern signals are identified in advance by the individual terminals.

As another example, the channel estimation frame may be transmitted from one of the antennas of the access point, and the same sequence may be repeated by the other antennas. By virtue of this, the pieces of the channel information with respect to the respective terminals are obtained regarding all of the antennas. At this point, transmission of the notification frame may be performed only once and the sequence following the transmission of the channel estimation frame may be repeated for the number of rounds equal to the number of the antennas.

When the terminals 1 to 6 have received the channel estimation frame(s) 502, the terminals 1 to 6 may transmit their respective report frames so that the one that obtained the access right transmits its report frame first in accordance with CSMA/CA (Carrier Sense Multiple Access with Carrier Avoidance). In this case, it is not necessary to transmit poll frames from the access point.

The access point 11 is allowed to carry out beamforming for multiple terminals and accordingly DL-MU-MIMO using the channel information obtained by the above-described sounding.

Figure 5:
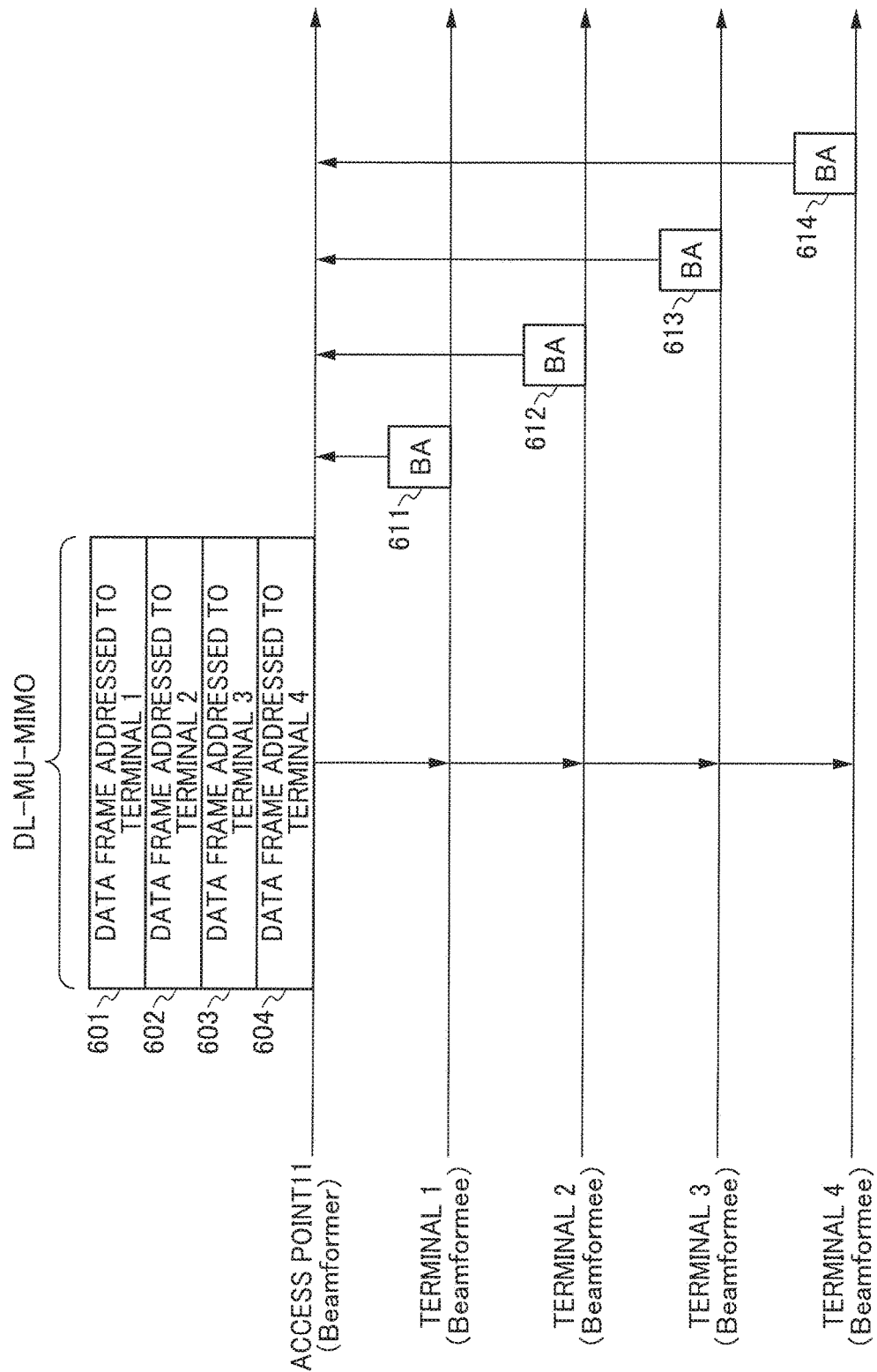
FIG. 5 is a diagram illustrating an example operation sequence between the access point and multiple terminals.

FIG. 5 illustrates an example of the operation sequence in a case where DL-MU-MIMO is carried out.

Before DL-MU-MIMO is carried out, by way of example, communications between the access point 11 and all or part of the terminals 1 to 6 are individually carried out based on CSMA/CA (single-user communication). The single-user communication refers to a communication scheme according to which communications are performed between the access point and the individual terminals.

As an example of the single-user communication, when the terminal retains data for uplink transmission and the terminal performs carrier sensing in accordance with CSMA/CA and obtains a right to access a wireless medium, then the terminal transmits the data frame. It should be noted that the access right may be obtained by transmission and reception of an RTS (Request to Send) frame and a CTS (Clear to Send) frame.

The access point 11 checks whether or not the reception was successful on the basis of FCS information (CRC, etc.) of the data frame. When it has been determined that the reception was successful, then the access point 11 transmits an acknowledgement response frame (ACK frame) to the terminal upon the lapse of an SIFS. When the reception was not successful, the access point 11 does not return the acknowledgement response frame. It should be noted, as will be described later, that the data frame to be transmitted may be an aggregation frame that aggregates a plurality of data frames (aggregation MAC (medium access control) protocol data unit; A-MPDU). The individual frames included in the aggregation frame may be called "subframe." If the data frame transmitted by the terminal is an aggregation frame, then the acknowledgement response frame by which the access point 11 responds is a Block Ack (BA) frame that includes acknowledgement information indicative of acknowledgement (successful or unsuccessful) for each sub-frame.

As one of the single-user communications, the access point 11 obtains pieces of channel quality information indicative of respective qualities of channels from the respective terminals belonging to the access point 11. As an example of the quality information, signal-to-noise ratio (SNR), received signal strength indicator (RSSI), and the like may be mentioned. For example, this embodiment considers SNR although the quality information is not limited to SNR. For example, the access point may transmit a frame requesting measurement of an SNR (management frame, etc.) so as to obtain an SNR of a terminal and may obtain the SNR as a response to this frame. Alternatively, the SNR may be included along with the channel information into the report frame which is a response in the course of the sounding. If it is possible to regard the channel with the terminal as symmetrical, then it is also possible to calculate the SNR on the basis of the signal received from the terminal and regard it as the SNR of the terminal. The above-described sounding may also be carried out as another one of the single-user communications.

When the access point 11 carries out DL-MU-MIMO, the access point 11 selects a plurality of terminals that are eligible for DL-MU-MIMO (i.e., the terminals 1 to 4 in this example) and generates data frames 601, 602, 603, and 604 that are transmitted to the terminals 1 to 4, respectively. Receiver addresses (RAs) of the data frames 601, 602, 603, and 604 are the MAC addresses of the terminals 1 to 4, respectively, and transmitter addresses (TAs) thereof are the MAC address of the access point (BSSID).

Also, the access point 11 determines transmission rates of the data frames 601, 602, 603, and 604 in the user selection scheduling. As the transmission rate, for example, MCS (Modulation and Coding Scheme) can be used. MCS defines a transmission rate by a set of a modulation scheme and a code rate. In this embodiment, an example is described where MCS is used as the transmission rate. The method of determining the MCS to be applied to the terminals will be described later. When the access point 11 obtains an access right to access a wireless medium in accordance with CSMA/CA, then the access point 11 carries out user-multiplexed transmission of the data frames 601 to 604. More specifically, the access point 11 modulates the data frames 601 to 604 in accordance with their respective transmission rates, and transmits them by beamforming based on the channel information of the terminals 1 to 4. It should be noted that predefined MCS or MCS determined by a known method should be applied to the various frames transmitted and received in the sounding illustrated in FIG. 4. The upper limit of the total number of streams to be transmitted by DL-MU-MIMO is equal to or less than the number of antennas of the access point.

Although the data frames are transmitted to the terminals 1 to 4 in this example, a management frame or control frame may be transmitted. The data frames to be transmitted to the terminals 1 to 4 may be an aggregation frame (A-MPDU) that aggregates multiple data frames.

When the terminals 1 to 4 each receive the corresponding one of the data frames 601 to 604 which are multiplex-transmitted from the access point, the terminals 1 to 4 check whether or not the reception of the corresponding one of the data frames has been successful. Also, in accordance with the check result, the terminals 1 to 4 transmit the acknowledgement response frames (BA frames) 611, 612, 613, and 614 in this example upon the lapse of respective amounts of time that are different from each other after completion of reception of the data frames. By way of example, the terminal 1 transmits the BA frame upon the lapse of an SIFS after completion of reception of the data frame, the terminal 2 transmits the BA frame upon the lapse of a total time of 2×SIFS after completion of reception of the data frame plus a BA frame length, the terminal 3 transmits the BA frame upon the lapse of a total time of 3×SIFS after completion of reception of the data frame plus 2×BA frame length, and the terminal 4 transmits the BA frame upon the lapse of a total time of 4×SIFS after completion of reception of the data frame plus 3×BA frame length. It is assumed here that the BA frame lengths are constant.

As another method of transmitting the acknowledgement response frames, the acknowledgement response frames may be transmitted sequentially from the individual terminals by repeated operations of transmitting BAR (BlockAck Request) frames from the access point to the individual terminals and transmitting the ACK frames (or BA frames) upon the lapse of an SIFS after completion of transmission of the BAR frames (in other words, the setting is given as Delayed BA).

The terminals 1 to 4 may transmit the BA frames by user multiplexed transmission upon the lapse of a predetermined time after completion of reception of the data frames. For example, the BA frames may be transmitted from the terminals 1 to 4 using the uplink multi-user MIMO (UL-MU-MIMO) technology. According to UL-MU-MIMO, the terminals 1 to 4 simultaneously transmit the acknowledgement response frames using the same frequency band. UL-MU-MIMO can be implemented by specifying pattern signals orthogonal to each other in the physical header of the BA frames which are transmitted by the terminals 1 to 4, and the access point separating the BA frames on the basis of the pattern signals. Alternatively, the terminals 1 to 4 may simultaneously transmit the BA frames using uplink (UL) OFDMA as another example of the user multiplexed transmission. Alternatively, as a further example of the uplink user multiplexed transmission, it is also possible to use a scheme that combines UL-OFDMA and UL-MU-MIMO. In the OFDMA scheme, the frequency components are defined as resource units each including one or a plurality of subcarriers, and the resource units are allocated to the terminals, and transmissions to the plurality of terminals or receptions from the plurality of terminals are simultaneously performed. The resource unit corresponds to a smallest unit of a communication resource. The transmissions to the plurality of terminals from the access point correspond to a downlink OFDMA, and transmissions from the plurality of terminals to the access point corresponds to an uplink OFDMA. A resource unit may refer to a sub-channel, a resource block or a frequency block etc.

It should be noted that the frames which the access point 11 transmits to the terminals 1 to 4 by DL-MU-MIMO may be frames having the same or different content. As a general representation, when it is represented that the access point or the multiple terminals transmit or receive X-th frames, then the X-th frames have the same or different content, where X may take any appropriate value. The X-th frames may be transmitted simultaneously or transmitted one after another in time series. Both cases are envisaged.

In the sequence of FIG. 4, the report frames 511, 521, 531, and 541 are transmitted sequentially from the terminals 1 to 4. Meanwhile, the report frames 511, 521, 531, and 541 may be transmitted by UL-MU transmission. As a scheme of UL-MU transmission, combination of MU-MIMO and OFDMA, or MU-MIMO and OFDMA, can be used. According to this scheme, it is not necessary to transmit the poll frames 503 to 505 from the access point 11. For example, the terminals 1 to 4 may simultaneously transmit the report frames 511, 521, 531, and 541 by uplink multi-plexed transmission upon the lapse of a predetermined time after completion of reception of the channel estimation frame(s) 502. Alternatively, the access point 11 may transmit a trigger frame that notifies the information necessary for UL-MU transmission upon the lapse of a predetermined time after transmission of the channel estimation frames 502. In this case, the terminals 1 to 4 transmit the report frames 511, 521, 531, and 541 by MU-UL transmission upon the lapse of a predetermined time after completion of reception of the trigger frame. It is assumed here that the resource (pattern signal or resource unit) used in MU-UL is specified by the trigger frame.

Here, in practice, a physical header (PHY header) is added at the beginning of the frame transmitted by the access point and the frame transmitted by the terminals, and physical packets including the physical header and the frame are transmitted. The physical packet may also be called "physical frame."

FIG. 6 illustrates an example of a format of the physical packet. The physical packet includes a physical header and a PHY payload. The physical header includes a Legacy Preamble portion and a Preamble portion in accordance with various standards such as 11n, 11ac, 11ax, etc. The PHY payload is a data portion which includes a frame that has been subjected to modulation processing. The Legacy Preamble has the same configuration as that of the physical header defined in IEEE802.11a, and includes the fields of L-STF, L-LTF, and L-SIG. L-STF and L-LTF indicate known bit patterns. They are used for the receiver devices to carry out reception gain adjustment, timing synchronization, channel estimation, and the like. The L-SIG includes information for the receiver devices to calculate the time necessary for transmission of the Preamble portion that follows L-SIG and the PHY payload.

The access point 11 repeatedly carries out, as an example of operation, DL-MU-MIMO transmission to the terminals 1 to 4 and the reception of the acknowledgement response frames from the terminals 1 to 4 as illustrated in FIG. 5.

User selection scheduling is described here. In accordance with the user selection scheduling, a plurality of terminals that are eligible for DL-MU-MIMO are selected. Here, various methods can be considered to select the DL-MU-MIMO-eligible terminals. For example, a method that selects terminals having low spatial correlations (inter-user interference or interference between terminals) and a method that selects terminals having the same or similar frame transmission time lengths may be mentioned. In addition, a method that selects terminals having the same or similar cycle of occurrence of frames and a method that selects terminals having the same or similar transmission power from the access point may also be mentioned. Further, a method that randomly selects terminals may also be relied on. The methods mentioned herein may be combined with each other.

An example where terminals having similar frame transmission time lengths are to be selected is described here. The transmission time length of a frame can be calculated based on the size of the frame and the transmission rate of the frame (MCS). As the transmission rate, the modulation and coding scheme (MCS) is used herein. The MCS defines a transmission rate based on a set of the modulation scheme and the coding rate. For example, an MCS whose modulation scheme is 16QAM with the coding rate of ¾, an MCS whose modulation scheme is QPSK with the coding rate of ⅓ may be mentioned. The frame length after coding is determined by the frame size and the coding rate, and the number of symbols is determined by the frame length after the coding and the modulation scheme. If the time per one symbol is Ts (μs), then the time length of the frame after the coding is given as "(number of symbols)×Ts." The time of one symbol is, by way of example, 4 (μs). The time length of one symbol may be able to be specified, in which case the specified time length may or should be used.

The MCS necessary for transmission to the terminal can be determined on the basis of the signal-to-interference noise ratio (SINR) of the terminal. An MCS having a higher rate can be applied when the SINR becomes larger, which means that the inter-user interference becomes lower.

FIG. 7 illustrates a relationship between SINR and packet error rate (PER). The horizontal axis represents the SINR, and the vertical axis the PER (packet error rate). With regard to the MCS, nine MCS, i.e., MCS0, MCS1, MCS2, MCS3, MCS4, MCS5, MCS6, MCS7, and MCS8 are considered. In the figure, a graph that corresponds to MCS6, MCS7, and MCS8 is illustrated. MCS0 to MCS8 may be the same MCSs as defined by IEEE802.11 or may be defined independently therefrom. It is assumed here that MCS8 has the highest transmission rate, and the transmission rates of MCS7, MCS6, and so forth becomes lower in this order. More than nine MCSs may be defined or less than nine MCSs may be defined. The a along the vertical axis represents a threshold of the PER. It is necessary to select an MCS whose PER does not exceed this threshold. For example, if the value of the SINR falls within the interval R1, then MCS7 or MCSs lower than that (MCS6 to MCS0) are applicable. As one example, the highest MCS is used from among the applicable MCSs.

It is not necessary for the access point to retain such a graph as illustrated in FIG. 7. It suffices that the access point has information indicative of the relationship between the SINR and the MCS to be applied. As one example, it is possible to use such a table as is illustrated in FIG. 8. The range of the SINR and the MCS to be applied are associated with each other. For example, if the SINR is not less than β6 and less than β7, then MCS6 is used. Instead of a table, a function may be used which outputs the MCS to be applied using the SINR as an input.

When the SINR is calculated in this manner, the MCS to be used can be determined based on the SINR. However, calculation of SINR in normal cases involves complicated calculation using a channel matrix or the like. In addition, when the combination of terminals is changed, the SINRs of the same terminals are changed as well. For example, let us suppose a combination of two terminals. Given a combination consisting of the terminal A and the terminal B, if the SINR of the terminal A is 15 dB, then the MCS to be applied will be MCS5. On the other hand, given a combination consisting of the terminal A and the terminal C, if the SINR of the terminal A is 11 dB, then the MCS to be applied will be MCS3. As a result, for example, terminals having the same or similar frame transmission time lengths are selected in the course of the user selection scheduling, it is necessary to perform calculation of the SINRs regarding various combination candidates, determine the MCSs to be used on the basis of the SINRs, and calculate the frame transmission time lengths. Hence, the time of the user selection scheduling is prolonged. The number of candidates for calculation of the SINRs increases as the number of the combinations of terminals increases. In view of this, this embodiment proposes a simple method of SINR calculation to provide a solution to this problem.

Specifically, in this embodiment, interference amount information is defined in advance in accordance with possible execution conditions of DL-MU-MIMO. The interference amount information represents the inter-user interference amount. A difference between (a) SNR and (b) inter-user interference amount is calculated as SINR, where the SNR is an SNR of a terminal obtained in advance and the inter-user interference amount is indicated by the interference amount information in accordance with the execution conditions to be used.

By way of example, the SINR is calculated by subtracting the inter-user interference amount from the SNR of the terminal. This can be expressed by the following expression:

SINR=(SNR of a terminal)−(inter-user interference amount)

The method of SINR calculation is not limited to this. For example, the SINR may be calculated by dividing the SNR of the terminal by the inter-user interference amount. This can be expressed by the following expression:

SINR=(SNR of the terminal)/(inter-user interference amount)

SINR is an example of the communication quality value, and other index values may be used as long as they are based on the quality information of the channel of the terminal and the inter-user interference amount.

As examples of the execution conditions of DL-MU-MIMO, a spatial multiplexing number and/or a channel aging time that has elapsed since the channel information was obtained may be mentioned. Also, as another example, a use of the system (the access point and the terminals) may be mentioned. As an example of the use of the system, indoor use and outdoor use may be mentioned. Further, as another example of the use of the system, use in a stationary state and use in a moving state may be mentioned. The user interference amount in accordance with the execution condition to be used is identified, and the inter-user interference amount is subtracted from the SNR, and thus the SINR is calculated. By virtue of this, it is allowed to calculate the SINR only involving low calculation load, so that it is made possible to carry out the user selection scheduling in a short period of time even when there are numerous candidates for the combination of the terminals.

Figure 9:
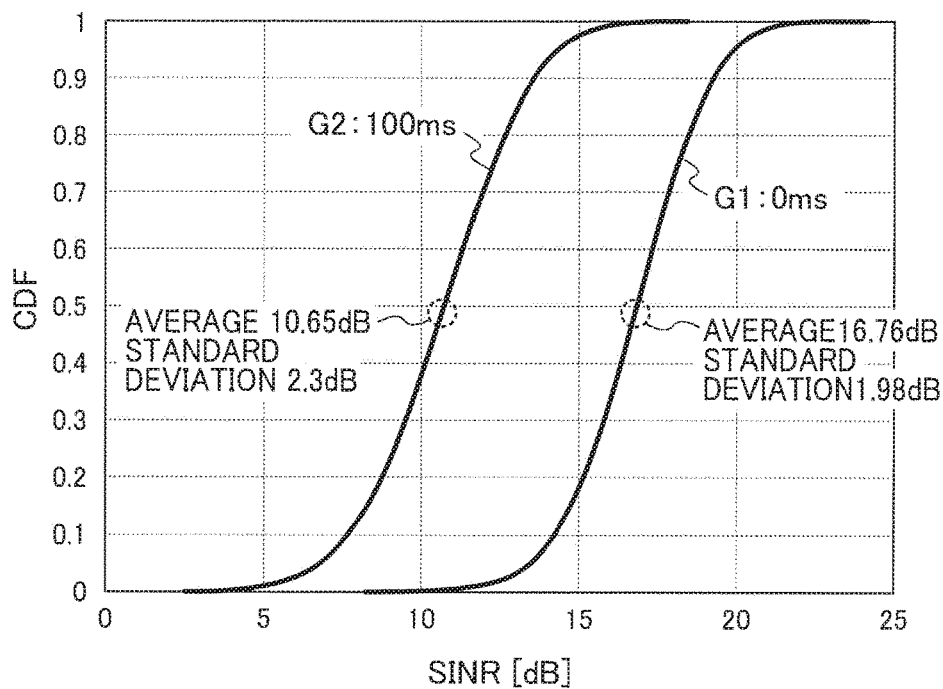
FIG. 9 is a diagram illustrating a relationship between SINR and cumulative probability.

FIG. 9 illustrates the result of simulation conducted where the number of antennas of the access point is 4; the number of antennas of the terminal is 1, the number of terminals (spatial multiplexing number) is 3; and Channel model D of IEEE802.11ac is used. The horizontal axis represents SINR, and the vertical axis represents a cumulative probability. The two graphs in the figure each represent a cumulative distribution function (CDF). The SNR of the terminal (reference SNR) in the simulation is 20 dB. The graph G1 represents the distribution where the channel aging time that has elapsed since the sounding (acquisition of the channel information) is 0 ms (more specifically, 0 ms or more and less than 1 ms). The graph G2 represents the distribution where the channel aging time after the sounding is 100 ms or more (more specifically, 100 ms or more and less than 101 ms).

The graphs G1 and G2 are obtained by statistical processing of respective SINRs of three terminals for a plurality of sets created by combining three terminals from among a plurality of terminals (i.e., a plurality of terminal combinations the element number of which is three). As statistical values, with regard to the cumulative distribution function of the graph G1, the average value of the SINRs is 16.76, and the standard deviation is 1.98 dB. In the cumulative distribution function of the graph G2, the average value of the SINRs is 10.65, and the standard deviation is 2.3 dB. When the channel aging time becomes longer, the graph is shifted leftward in the figure. Although simulation is carried out here, a similar graph may be created by actual measurement values.

The base point of the channel aging time after the sounding may be a time point at which the channel information is obtained from the terminal, or may be a time point at which the channel estimation frame is transmitted to the terminal. Alternatively, the base point may be a time point at which reception of the channel information is completed from all the terminals subjected to the estimation. The base point may be a time point determined by any other methods.

Figure 10:
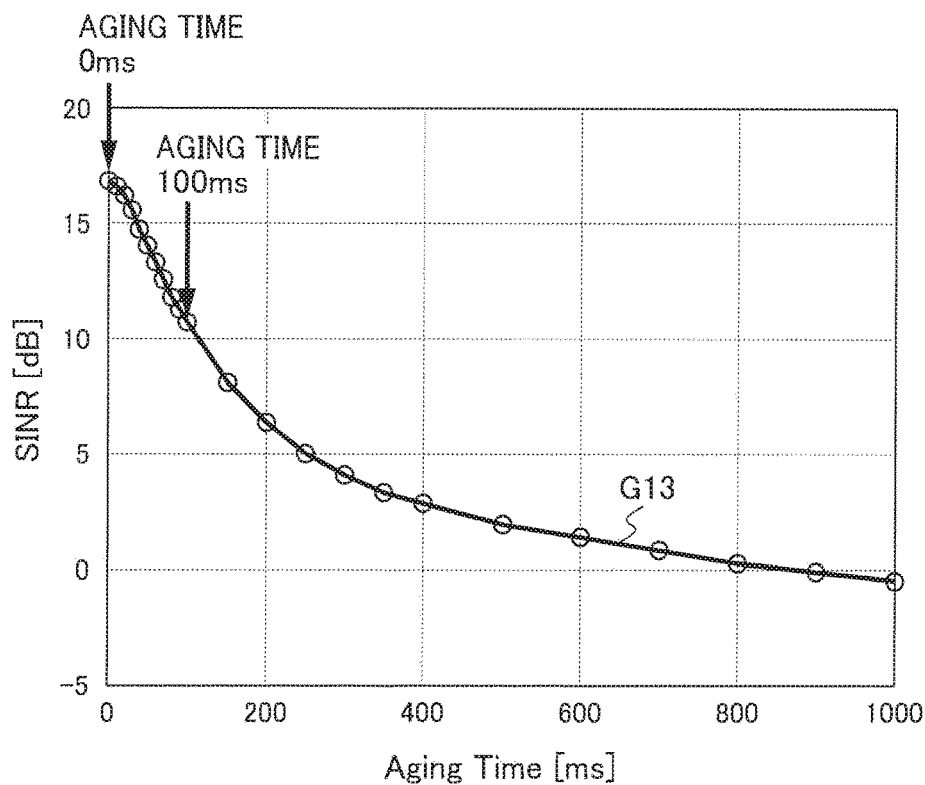
FIG. 10 is a diagram illustrating a relationship between channel aging time after sounding and SINR.

FIG. 10 illustrates average values of SINRs calculated with regard to various channel aging times and plotted in the coordinate system defined by the horizontal axis representing the channel aging time and the vertical axis representing the SINR. The graph G13 is a curve formed by connecting these plot points. The conditions of the simulation are the same as those of FIG. 9. It will be appreciated that the average value of the SINRs becomes smaller with the passage of the channel aging time. Specifically, since the channels vary due to the influence of the Doppler variation, use of the same channel information causes degradation in the average value of the SINRs of the terminals with the aging time. In other words, the average value of the inter-user interference amounts increases as well with the aging time.

Figures 11, 12:
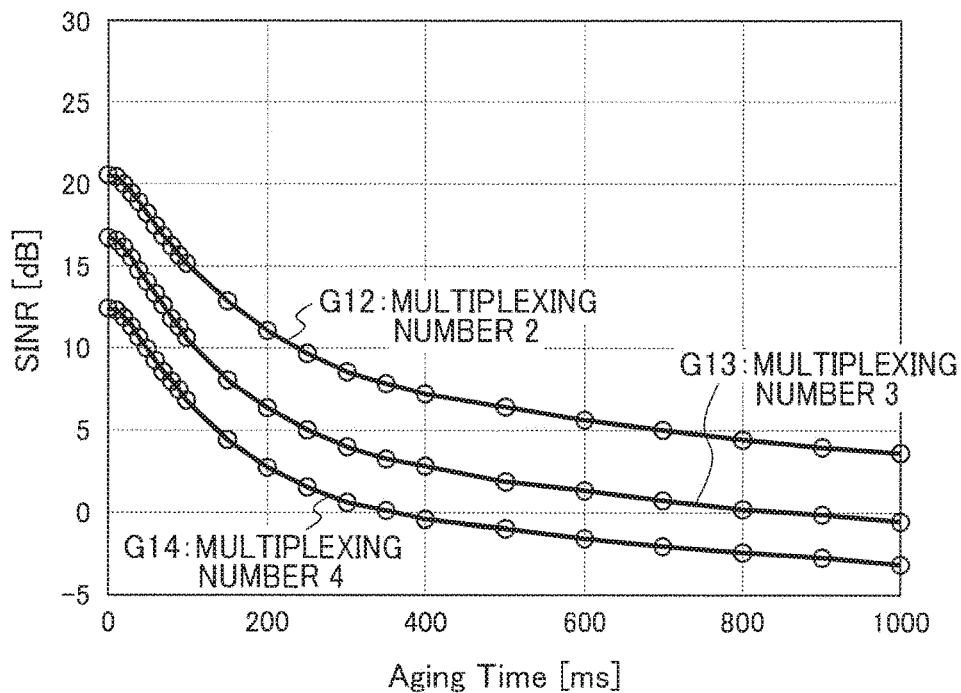
FIG. 11 is a diagram illustrating a relationship between channel aging time after sounding and SINR.
FIG. 12 is a diagram illustrating a table of multiplexing number, channel aging time, and inter-user interference amount.

In FIG. 10, the spatial multiplexing number is 3. FIG. 11 illustrates graphs which depict additional two cases where the spatial multiplexing numbers are 2 and 4, respectively, in addition to the case where the spatial multiplexing number is 3. The other simulation conditions are the same as those of FIGS. 9 and 10. Given the same channel aging time after the sounding, it can be appreciated that a larger spatial multiplexing number results in a lower average value of the SINRs. In other words, when the spatial multiplexing number becomes larger, then the average value of the inter-user interference amounts also becomes larger.

As one example, the channel aging time after the sounding and the spatial multiplexing number are used as the execution condition of DL-MU-MIMO. For each spatial multiplexing number, a value from which the average value of the SINRs in accordance with the channel aging time is subtracted is defined, as the interference amount information indicative of the inter-user interference amount, based on the reference SNR (=20 dB). In the example of FIG. 10, the average value of the SINRs when the channel aging time is 0 ms (less than 1 ms) is 16.76, so that the inter-user interference amount to be defined is 3.24 dB which is obtained by subtracting 16.76 from 20. Also, the average value of the SINRs when the channel aging time is 100 ms (100 ms or more and less than 101 ms) is 10.65, so that the inter-user interference amount to be defined is 9.35 dB which is obtained by subtracting 10.65 from 20. In the cases of other spatial multiplexing numbers as well, interference amount information is defined for each channel aging time in the same manner. For example, if the spatial multiplexing number is 2, the user interference amount to be defined when the channel aging time is 0 ms (less than 1 ms) will be defined as a value that is smaller than the above-described 3.24 dB. Here, a case is illustrated where the spatial multiplexing number and the channel aging time are taken into account as the execution condition of DL-MU-MIMO.

FIG. 12 is a table that defines the relationships among the spatial multiplexing number, the channel aging time, and the inter-user interference amount. In the above-described example, if the spatial multiplexing number is 3 and the channel aging time is 0 ms, then the inter-user interference amount is 3.24 dB. If the spatial multiplexing number is 3 and the channel aging time is 100 ms, then the inter-user interference amount is 9.35 dB. Here, the cases where the spatial multiplexing numbers are 2 to 4 are illustrated. However, if the access point is equipped with five or more antennas, then the spatial multiplexing number can also be 5 or more.

In the example of FIG. 12, the size of the intervals of the channel aging times is, but not limited to, one as indicated as 1, 2, 3, and so forth in the figure. For example, the inter-user interference amount may be defined with larger intervals such as 0 to 10, 11 to 20, 21 to 30, and so forth.

Also, since decrease in SINR becomes less sharp as the channel aging time becomes longer (see FIGS. 10 and 11), the sizes of the intervals of the channel aging time may be defined such that they become larger in accordance with the channel aging time such as 0, 1, 2 to 4, 5 to 10, 11 to 20, . . . , 100 to 110, . . . , 400 to 500, and so forth. The table of this case is illustrated in FIG. 13.

In the examples of FIGS. 12 and 13, both of the spatial multiplexing number and the channel aging time are taken into account as an execution condition of DL-MU-MIMO. However, it is also possible to take into account either the spatial multiplexing number or the channel aging time, not both of them. If the spatial multiplexing number only is to be taken into account, a table having the format obtained by deleting the column of "Aging Time" in FIG. 12 or FIG. 13 may or should be provided. An example of the table of this case is illustrated in FIG. 14. When the inter-user interference amount is determined, a representative value that fall within the range of the considered channel aging times may or should be relied on. For example, the inter-user interference amount may be determined based on an average SINR that corresponds to the central time in the range normally considered as the channel aging time.

Also, if the channel aging time only is taken into account, a table having a format obtained by deleting the column of "Spatial Multiplexing Number" from the table of FIG. 12 may or should be provided. An example of the table of this case is illustrated in FIG. 15. When the inter-user interference amount is determined, the inter-user interference amount may or should be determined based on a representative value such as an average or median value of the average SINRs of the respective spatial multiplexing numbers.

Also, the use of the system may be taken into account (outdoor or indoor use, and the like) as an execution condition of DL-MU-MIMO. In the above-described simulations (FIGS. 9 to 11), the channel model_D is used, which corresponds to an indoor scenario. In the same manner, tables as illustrated in FIG. 12 to FIG. 15 can be generated for outdoor use by carrying out simulation using the model that corresponds to an outdoor scenario. In normal cases, an outdoor moving speed of a terminal is faster than its indoor moving speed. When the moving speed of the terminal is fast, the Doppler frequency becomes large, as a result of which the (average value of the) inter-user interference amount becomes large. Also, larger multipath fading is expected outdoors than indoors. Use of a model that reflects these tendencies is considered as the model that corresponds to the outdoor scenario. As has been described above, even with the same channel aging time or the same spatial multiplexing number, it is expected that the inter-user interference amounts differ in accordance with the uses of the system, and it is made possible to use more appropriate inter-user interference amount depending on the use (environment) by drawing upon different user interference amounts that are defined by the respective uses of the system.

Example tables similar to that of FIG. 12 and created for outdoor and indoor uses, respectively, are illustrated in FIG. 16(A) and FIG. 16(B), respectively. These tables have the same format but different values appear in the column of "Inter-User Interference Amount." Here, although the example tables of indoor and outdoor uses are described on the basis of the format of FIG. 12, these tables can be provided in the same or similar manner based on the formats as illustrated in FIGS. 13 to 15.

The above-described SINR calculation method does not depend on which terminal is combined with this terminal, and it is not necessary to perform matrix operation. Accordingly, it is made possible to speedily calculate the SINR of the terminal and shorten the time associated with the user selection schedule.

Figure 17:
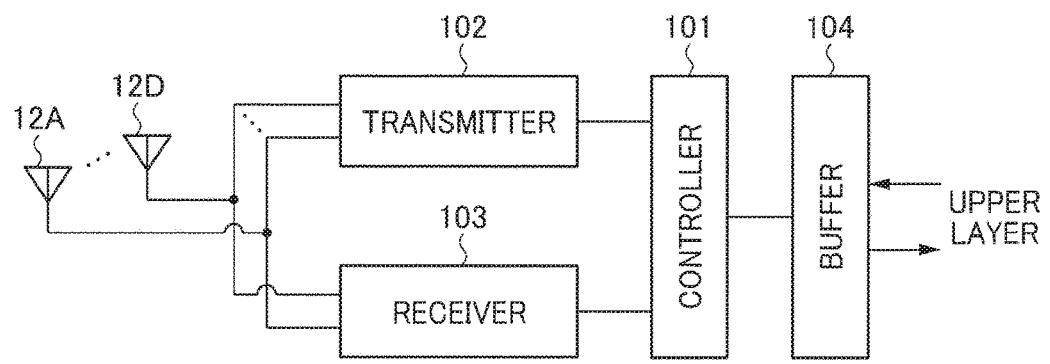
FIG. 17 is a functional block diagram of a wireless communication device incorporated in an access point.

FIG. 17 is a functional block diagram of a wireless communication device incorporated in the access point 11. As described above, the access point 11 is connected at least to the network to which the terminals 1 to 6 illustrated in FIG. 1 belong, and can further be connected to another network different from the former network. FIG. 11 illustrates a configuration of a wireless communication device connected to the network to which the terminals 1 to 6 belong.

The wireless communication device in the access point 11 includes antennas 12A, 12B, 12C and 12D, a controller 101, a transmitter 102, a receiver 103, and a buffer 104. The number of the antennas is four although the number may be one or more. The controller 101 corresponds to controlling circuitry or a baseband integrated circuit which controls communication with the terminals, and the transmitter 102 and the receiver 103 form a wireless communicator or an RF integrated circuit which transmits and receives frames via the antenna as an example. A process of the controller 101, and all or a part of a digital region process of the transmitter 102 and the receiver 103, or a process of the communication control device may be performed by software (program) executing on a processor such as a CPU, or may be performed by hardware, or may be performed by the both of these software and hardware. The access point may include a processor performing the process of the controller 101, all or a part of the transmitter 102 and the receiver 103.

The buffer 104 is a storage for transferring a frame, data or the like between an upper layer and the controller 101. The buffer 104 may be a volatile memory such as a DRAM or a non-volatile memory such as a NAND, or an MRAM.

The upper layer may store the frame received from another network in the buffer 104 for relaying to the network in the terminal side, or takes in, from the controller 101, the frame received from the network or a payload thereof via the buffer 104. The upper layer may perform an upper communication process than a MAC layer such as a TCP/IP or a UDP/IP. Alternatively, the TCP/IP or a UDP/IP may be performed in the controller 101 and the upper layer may also perform a process of an application layer of processing the data upper than the TCP/IP or the UDP/IP. An operation of the upper layer may be performed by software (program) processing by a processor such as a CPU, or may be performed by hardware, or may be performed by the both of the software and the hardware.

The controller 101 mainly performs a process of the MAC layer, a part of a process of a physical layer (which may include processing of a multi-user transmission such as DL-MU-MIMO). The controller 101 transmits and receives the frame (more specifically, a physical packet having a physical header added to the frame) via the transmitter 102 and the receiver 103 to control the communication with the terminals. The controller 101 may also control so as to periodically transmit a beacon frame for notifying attribute information and synchronization information etc. on BSS (Basic Service Set) of the access point. The controller 101 may include a clock generator generating a clock. Additionally, the controller 101 may be configured to receive the clock externally input. The controller 101 may manage an internal time using the clock generated by the clock generator or the clock externally input, or the both of these. The controller 101 may output externally the clock created by the clock generator.

The controller 101, on receiving an association request from the terminal, performs an association process to exchange required information on capability or an attribute etc. each other and establishes the wireless link with the terminal. The required information may include capability information indicative of whether or not multi-user transmission scheme such as DL-MU-MIMO can be implemented. If any, the controller 101 may carry out an authentication process with the terminal in advance.

The controller 101 periodically checks the buffer 104 to confirm the state of the buffer 104 such as existence or non-existence of data for downlink transmission. Alternatively, the controller 101 may check the state of the buffer 104 according to a trigger given from an external device as such the buffer 104.

The controller 101 carries out communications with the terminals belonging to the access point and obtains the quality information (SNR, etc.) of the channels with the terminals. For example, the controller 101 may transmit frames requesting measurement of SNR (management frame, etc.) and obtain the SNRs as a response to these frames. Alternatively, SNRs may be included along with the channel information into the report frames which are a response in the course of the sounding. If it is possible to regard the channel between the terminal and access point as symmetrical, then the controller 101 may calculate the SNR on the basis of the signal received by the access point from the terminal and regard it as the SNR of this terminal.

When DL-MU-MIMO is to be carried out, the controller 101 carries out sounding in advance and obtains the channel information from the eligible terminals of DL-MU-MIMO. Specifically, the controller 101 transmits the channel estimation frames and receives the report frames that include the channel information from the respective terminals. The example of the sequence of the sounding is as has been illustrated in the above-described FIG. 4.

The controller 101 calculates an SINR of a terminal in accordance with an SNR of the terminal and the execution condition of the spatially multiplexed transmission (DL-MU-MIMO transmission) to be used. For example, the controller 101 identifies the relevant inter-user interference amount from the table (see FIG. 12 or 13, etc.) in accordance with the spatial multiplexing number and the channel aging time after the last sounding. The SINR is calculated by subtracting the identified inter-user interference amount from the SNR of the terminal. It should be noted that, when the individual terminals share one and the same channel aging time, then one and the same inter-user interference amount will be shared by the individual terminals. With regard to the execution condition of the spatially multiplexed transmission, it is possible to only take into account either of the spatial multiplexing number and the channel aging time. Also, the use of the system, i.e., the use of the access point or the terminal may be taken into account.

The controller 101 determines transmission rate (MCS, etc.) for transmission based on the SINRs of the respective terminals. For example, the controller 101 identifies the relevant MCSs from the SINRs of the respective terminals on the basis of the table as illustrated in FIG. 8. In addition, the controller 101 calculates the frame transmission time lengths of the respective terminals based on the transmission frames to be transmitted to the individual terminals and the MCSs of the respective terminals.

The access point determines the terminals eligible for DL-MU-MIMO (the combination of terminals) on the basis of the proximity of the frame transmission time lengths of the terminals. For example, the access point determines one terminal that serves as a standard (reference terminal), and further a predetermined number of terminals having the same or most similar frame transmission time lengths with respect to this reference terminal (having the smallest absolute value) are selected. The predetermined number is a value that is equal to or smaller than a value obtained by subtracting one from the spatial multiplexing number. The reference terminal and the predetermined number of terminals are defined as the terminals eligible for DL-MU-MIMO. The frame transmission time lengths of the predetermined number of the terminals to be selected may be selected in accordance with a condition that they have a frame transmission time length equal to or lower than the frame transmission time length of the reference terminal.

Also, the DL-MU-MIMO-eligible terminals may be determined based on the proximity of the frame transmission time lengths of all the terminals without determining the terminal that serves as the reference. In that case, the number of terminals to be selected will take a value that is equal to or smaller than the spatial multiplexing number.

Any methods may be relied on to determine the reference terminal. For example, a terminal (preferential terminal) for which the frame needs to be most preferentially transmitted is determined as the reference terminal. The preferential terminal may be the one that is specified as the destination of the frame stored in the foremost location of the transmission buffer in the access point. Alternatively, the preferential terminal may be a terminal which is specified as the destination of the frame whose traffic type or access category takes a predetermined value. Alternatively, the preferential terminal may be a terminal the frame addressed to which remains to exist in the buffer for an amount of time equal to or larger than a predetermined amount of time. A randomly selected terminal may be determined as the reference terminal.

The controller 101 does not always need to use the proximity of the frame transmission time lengths of the respective terminals in the course of determining the DL-MU-MIMO-eligible terminals (the combination of terminals), and may rely on any method as long as it determines the DL-MU-MIMO-eligible terminals (the combination of terminals) using the SINRs of the respective terminals calculated based on the defined inter-user interference amount.

The access point performs coding and modulation of the frames for the selected terminals by their respective MCSs and transmits these frames by DL-MU-MIMO transmission. It should be noted that a predefined MCS may or should be used for the above-described frame for the channel estimation used in the sounding.

Also, the combination of the terminals may be modified as appropriate in accordance with the communication qualities of the individual terminals such as SINR and frame sizes of the frames stored in a buffer for each terminal. The combination of the terminals may be modified at a timing at which an MCS of any one of the terminals is lowered, at a timing at which any one of the terminals takes a predetermined MCS or an MCS lower than that, or at a timing at which the sounding is performed, which are used as a trigger to modify the combination of the terminals. The same set of terminals may be maintained as long as these triggers causing the change do not occur.

The controller 101, when transmitting the frame (more specifically, the physical packet having the physical header added to the frame), as an example, performs the carrier sensing in accordance with the CSMA/CA before the transmission, and if a carrier sensing result shows being idle (if a value of the CCA is equal to or less than a threshold), the access right to the wireless medium is acquired. The controller 101 subjects the frame to processes such as encode and a modulation process (which may include MIMO modulation) based on the MCS to output to the transmitter 102. The transmitter 102 subjects the input frame (more specifically, the physical packet having the physical header added thereto) to DA conversion, a filtering process to extract components of a desired band, frequency conversion (up-conversion) and the like to amplify signals obtained through these processes by a pre-amplifier and radiate the amplified signals as radio waves from the plural antennas into the space. In the case of single-user transmission, the same signal may be simultaneously transmitted by performing processing of the physical layer for each transmission channel corresponding to each antenna, or may be transmitted using only one transmission channel. It is also possible to control the directionality of the transmission using multiple antennas.

The signal received by each antenna in the access point is processed in the receiver 103 for each reception system corresponding to the each antenna. The received signal of each antenna is amplified by a low noise amplifier (LNA) in the corresponding reception system, is subjected to frequency conversion (down-convert), and is subjected to a filtering process, thereby allowing a desired band component to be extracted. Each extracted signal is further converted into a digital signal through AD conversion and a resultant packet is input to the controller 101. The signals in the reception systems are synthesized by a diversity technique to acquire the packet. Alternatively, it is also possible to carry out reception with a configuration according to which only one antenna is connected to the receiver 103 and the remaining antennas are not connected to the receiver 103.

The controller 101 subjects the received packet to processes such as demodulation and error-correcting decode to acquire the frame to carry out CRC check of the frame (in a case of the aggregation frame, the CRC check is carried out for the plural data frames in the aggregation frame). The controller 101 transmits the acknowledgement response frame (more specifically, the packet having the physical header added thereto) after elapse of a predefined time period from the completion of receiving the frame from the terminal. In a case where the frame is the aggregation frame, the acknowledgement response frame is the BA frame. The transmitter 102 subjects the acknowledgement response frame to DA conversion, a filtering process to extract components of a desired band, frequency conversion (up-conversion) and the like to amplify signals obtained through these processes by a pre-amplifier and radiate the amplified signals as radio waves from the plural antennas into the space.

Although the comparison in this embodiment is performed based on the transmission time lengths of the frames, it may be performed based on the transmission time lengths of physical packets. The transmission time length of the physical packet is equal to the sum of the transmission time length of the physical header and the transmission time length of the frame. In normal cases, the physical headers of the terminals have the same length and a common MCS is applied thereto, so that the transmission time lengths of the physical headers of the individual terminals will be the one and the same length. Meanwhile, the individual physical headers may have different lengths and different MCSs may be applied to the individual physical headers. Also, as the transmission time length of the frame, the comparison may be performed based on not the transmission time length of the entire frame but the transmission time length of part of the frame. For example, the comparison may be performed based on the transmission time lengths of the frame body fields of frames (see FIG. 2). In particular, in the case of a data frame, the length of the frame body field is thought to be often predominant relative to the length of the MAC header. Accordingly, when the comparison is performed based on the transmission time lengths of the frame body fields, it can be said that an effective determination can be made.

The controller 101 may access a storage for storing the information to be transmitted via the frame to the terminal or the information received from the terminal, or the both of these to read out the information. The storage may be a buffer included in the controller 101 (internal memory) or a buffer provided outside the controller 101 (external memory). The storage may be a volatile memory or a non-volatile memory. The storage may also be an SSD, a hard disk or the like other than the memory.

The above described isolation of the processes of the controller 101 and the transmitter 102 is an example, and another form may be used. For example, the controller 101 may perform the process until the digital region process and the DA conversion, and the transmitter 102 may perform the process subsequent to the DA conversion. As for the isolation of the processes of the controller 101 and the receiver 103, similarly, the receiver 103 may perform the process before the AD conversion and the controller 101 may perform the digital region process including processes following the AD conversion.

As one example, the baseband integrated circuit in accordance with this embodiment corresponds to the section that carries out the processing of digital domain, the section that carries out the processing of the DA conversion in the transmission, and the section that carries out the processing processes including and following the AD conversion in the reception. The RF integrated circuit corresponds to the section that carries out the processing processes following the DA conversion in the transmission and the section that carries out the processing processes prior to the AD conversion in the reception. The integrated circuit for the wireless communication in accordance with this embodiment includes at least a baseband integrated circuit from the baseband integrated circuit and the RF integrated circuit. The processing processes between blocks or processing processes between the baseband integrated circuit and the RF integrated circuit may be demarcated from each other in accordance with any method other than those described herein.

Figure 18:
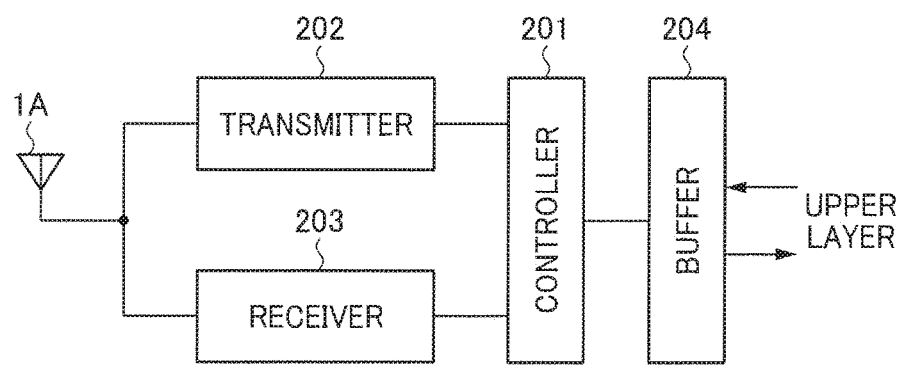
FIG. 18 is a functional block diagram of a wireless communication device incorporated in a terminal.

FIG. 18 is a functional block diagram of the wireless communication device incorporated in the terminal. In this example, although an example of the configuration of the terminal 1 is illustrated, any one of the respective wireless communications devices incorporated in the respective terminals 2 to 6 illustrated in FIG. 1 has the configuration illustrated in FIG. 13.

The wireless communication device includes a controller 201, a transmitter 202, a receiver 203, at least one antenna 1, and a buffer 204. The controller 201 corresponds to controlling circuitry or a baseband integrated circuit which controls communication with the access point 11, and the transmitter 202 and the receiver 203 form a wireless communicator or an RF integrated circuit which transmits and receives frames as an example. A process of the controller 201, and all or a part of a digital region process of the transmitter 202 and the receiver 203 may be performed by software (program) executing on a processor such as a CPU, or may be performed by hardware, or may be performed by the both of the software and the hardware. The terminal may include a processor performing the process of the controller 201, all or a part of the transmitter 202 and the receiver 103.

The buffer 204 is a storage for transferring a frame, data or the like between an upper layer and the controller 201. The buffer 204 may be a volatile memory such as a DRAM or a non-volatile memory such as a NAND, or an MRAM.

The upper layer generates the frames or data to be transmitted to other terminals, the access point 11, or a device on another network such as a server and stores the generated frames in the buffer 204, or takes in, via the buffer 204, the frame or the payload thereof received from other terminals, the access point, or a device on another network such as a server. The upper layer may perform an upper communication process than a MAC layer such as a TCP/IP or a UDP/IP. The TCP/IP or the UDP/IP may be performed in the controller 201 and the upper layer may perform a process of an application layer of processing the data upper than the TCP/IP or the UDP/IP. A process of the upper layer may be performed by software (program) executing on a processor such as a CPU, or may be performed by hardware, or may be performed by the both of these software and hardware.

The controller 201 mainly performs a process of the MAC layer. The controller 201 transmits and receives the frames via the transmitter 202 and the receiver 203 to and from the access point 11 to control the communication with the access point 11. The controller 201 may include a clock generator generating a clock. Additionally, the controller 201 may be configured to receive the clock externally input. The controller 201 may manage an internal time using the clock generated by the clock generator or the clock externally input. The controller 201 may output externally the clock created by the clock generator.

The controller 201, as an example, receives the beacon frame to detect the attribute and synchronization information of BSS of the access point 11 and then transmits an association request to the access point 11 to perform an association process in response to the received beacon. Thereby, the control 201 exchanges required information on capability or an attribute etc. each other and establishes the wireless link with the access point 11. The required information may include capability information of whether the access point or the terminal is compliant with DL-MU-MIMO. If any, the controller 201 may carry out an authentication process with the access point 11.

The controller 201 periodically checks the buffer 204 to detect a state of the buffer 204 such as whether or not the data exists to be transmitted by way of the uplink transmission. Alternatively, the controller 201 checks the state of the buffer 204 by a trigger from the external such as the buffer 204 or the like. Once the controller 201 confirms the existence of the data in the buffer 204, it may transmit, after acquiring the access right to the wireless medium (transmission right) in accordance with the CSMA/CA or the like, the frame containing the relevant data (more specifically, the physical packet having the physical header added thereto) via the transmitter 202 and the antenna 1. It should be noted that the acquisition of the access right may be performed by transmitting an RTS frame to the access point and receiving a CTS frame.

The transmitter 202 subjects the frame input from the controller 201 to DA conversion, a filtering process to extract components of a desired band, frequency conversion (up-conversion) and the like to amplify signals obtained through these processes by a pre-amplifier and radiate the amplified signals as radio waves from one or more antennas into the space. When multiple antennas are provided, the same signal may be simultaneously transmitted from the antennas. Alternatively, it is also possible to control the transmission directionality using multiple antennas.

The signal received by the antenna 1 is processed in the receiver 203. The received signal is amplified in the receiver 203 by the LNA, subjected to frequency conversion (down-conversion) and a filtering process to extract components of the desired band. The extracted signals are further converted into digital signals through AD conversion and output to the controller 201. The controller 201 performs demodulation, error-correcting decode, and a process of the physical header, and thereby the frame are such as the data frame (including the frame received by way of the DL-MU-MIMO) are acquired. If a receiver address (Address 1) of the MAC header of the frame matches the MAC address of the terminal of itself, the relevant frame is processed as the frame directed to the terminal of itself. If not match, the relevant frame is discarded.

The controller 201 carries out the CRC check of the received frame (in a case of the aggregation frame, the CRC check is carried out for the plural data frames in the aggregation frame). The controller 201 transmits the acknowledgement response frame via the transmitter 202 after elapse of a certain time period such as the SIFS from the completion of receiving the frame.

When the channel estimation frame(s) has been received from the access point, the controller 201 calculates the variations in the amplitude and the phase on the basis of the reception signal of the predetermined field included in the channel estimation frame and the known signal that is already known to the controller 201. In addition, the controller 201 generates a report frame that includes channel information indicative of the calculated amplitude and phase variations and transmits the generated report frame to the access point.

When the controller 201 receives a frame requesting measurement of channel quality from the access point, the controller 201 obtains the quality information by the measurement and transmits a frame that includes the quality information. For example, the controller 201 measures the quality of the channel using a known signal included in the physical header of the frame and obtains the quality information. As an example of the quality information, SNR, RSSI, or the like may be mentioned although the quality information is not limited to them. Alternatively, the quality information may be included in the above-described report frame along with the channel information. Also, when the access point transmits a frame recruiting terminals having the need of DL-MU-MIMO transmission by broadcast or multicast transmission, and in response thereto the controller 201 transmits a response frame including a notification to the effect that there is the need of it and the quality information. Further, the controller 201 may voluntarily carry out transmission of a frame including the quality information indicative of the quality of the channel. It is also possible to transmit a frame including the quality information indicative of the quality of the channel by any other methods that are not described herein.

If the controller 201 transmits the frame such as the data frame to the access point, it receives via the receiver 203 the acknowledgement response frame (such as the ACK frame or the BA frame) transmitted from the access point after elapse of a certain time period such as the SIFS from the completion of the transmission. The controller 201 determines whether or not the data frame (the individual aggregated data frames in a case of the aggregation frame) is successfully transmitted on the basis of the acknowledgement response frame.

The controller 201 may access a storage device that stores either information to be notified to the access point or the information notified from the access point or both of these pieces of information and read the information. The storage device may be an internal memory device, an external memory device, a volatile memory device, or a non-volatile memory. Also, the storage devices such as an SSD and a hard disk may be used in place of the memory device.

The above described isolation of the processes of the controller 201 and transmitter 202 is an example, and another form may be used. For example, the controller 201 may perform the process until the digital region process and the DA conversion, and the transmitter 202 may perform process subsequent to the DA conversion. As for the isolation of the processes of the controller 201 and the receiver 203, similarly, the receiver 203 may perform the process before the AD conversion and the controller 201 may perform the digital region process including processes following the AD conversion.

As one example, the baseband integrated circuit in accordance with this embodiment corresponds to the section that carries out the processing of digital domain, the section that carries out the processing of the DA conversion in the transmission, and the section that carries out the processing processes including and following the AD conversion in the reception. The RF integrated circuit corresponds to the section that carries out the processing processes following the DA conversion in the transmission and the section that carries out the processing processes prior to the AD conversion in the reception. The integrated circuit for the wireless communication in accordance with this embodiment includes at least a baseband integrated circuit from the baseband integrated circuit and the RF integrated circuit. The processing processes between blocks or processing processes between the baseband integrated circuit and the RF integrated circuit may be demarcated from each other in accordance with any method other than those described herein.

Figure 19:
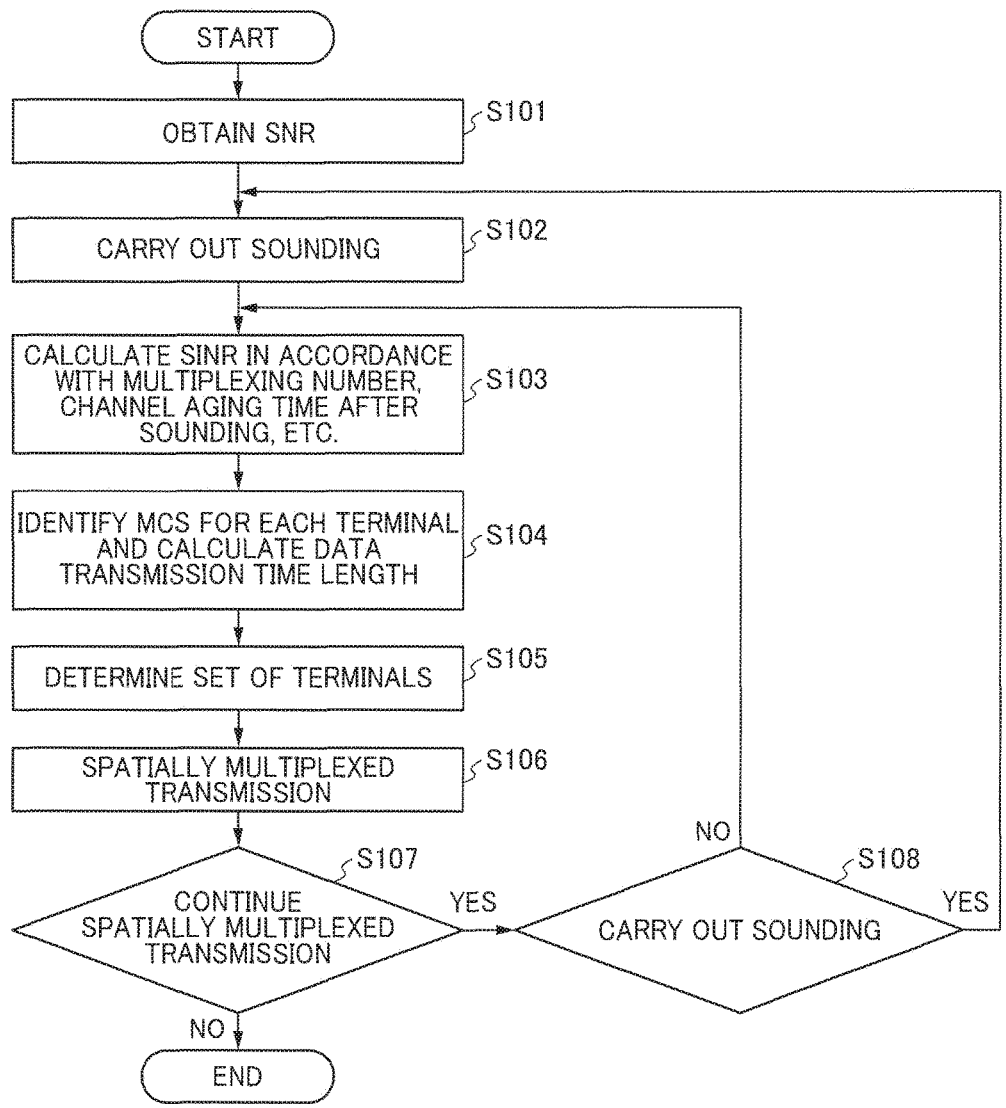
FIG. 19 is a flowchart of operation of the access point.

FIG. 19 is a flowchart illustrating an example of the operation of the access point in accordance with this embodiment. The access point obtains the quality information (SNRs in this example) indicative of the qualities of the channels from terminals belonging to the access point (S101). Any appropriate method may be relied on to obtain the SNRs. The access point may transmit frames requesting measurement of the SNRs (management frame, etc.) and obtain the SNRs as a response to these frames. Alternatively, SNR may be included along with the channel information into the report frame which is a response in the course of the sounding, which will be described later. If it is possible to regard the channel between the terminal and the access point as symmetrical, then it is also possible to calculate the SNR on the basis of the signal received from the terminal and regard it as the SNR of the terminal.

The access point carries out sounding at any appropriate timing or predetermined timing prior to carrying out DL-MU-MIMO (S102). The example sequence of the sounding is illustrated in FIG. 4. The sounding is carried out, by way of example, with a plurality of terminals having the capability of carrying out DL-MU-MIMO or a plurality of terminals that become candidates for DL-MU-MIMO to be carried out. Here, the sounding is carried out with the terminals 1 to 6 and pieces of channel information are obtained from the respective terminals.

Also, the access point calculates the SINRs of the respective terminals in accordance with the execution condition or conditions of the spatially multiplexed transmission (DL-MU-MIMO transmission). For example, the access point identifies the relevant inter-user interference amount from the table (see FIG. 12, FIG. 13, etc.) in accordance with the spatial multiplexing number and the channel aging time after the last sounding. The access point calculates the SINRs on the basis of the differences between the SNRs of the respective terminals and their respective inter-user interference amounts. For example, the SINRs are calculated by subtracting the respective inter-user interference amounts from the respective SNRs of the terminals. As the execution condition of the spatially multiplexed transmission, only the spatial multiplexing number may be taken into account or only the channel aging time may be taken into account. Also, the use of the system may be taken into account.

The access point determines transmission rates (MCSs in this example) for transmission on the basis of the SINRs of the respective terminals (S104). For example, the access point identifies the MCSs that correspond to the SINRs of the respective terminals on the basis of the table illustrated in FIG. 8. The access point calculates the transmission time lengths of the frames of the individual terminals based on the transmission frames to be transmitted to the individual terminals and the MCSs of the respective terminals (S105).

The access point determines the terminals eligible for DL-MU-MIMO (the combination of terminals) on the basis of the proximity of the frame transmission time lengths of the respective terminals (S105) For example, one reference terminal is determined, and further a predetermined number of terminals having the same or most similar frame transmission time lengths with respect to this reference terminal (having the smallest absolute value) are selected. The predetermined number is a value that is equal to or lower than a value obtained by subtracting one from the spatial multiplexing number. The reference terminal and the predetermined number of terminals are defined as the DL-MU-MIMO-eligible terminals. The frame transmission time lengths of the predetermined number of the terminals to be selected may be selected in accordance with a condition that the they have a frame transmission time length equal to or lower than the frame transmission time length of the reference terminal.

The access point performs coding and modulation of the frames for the selected terminals by their respective MCSs and transmits them by DL-MU-MIMO transmission (S106). After the transmission, the access point receives acknowledgement frames from the respective terminals (see FIG. 5). After that, it is determined whether or not the DL-MU-MIMO is carried out again. If it is not carried out again, then the processing associated with the flow is completed. If it is carried out again, then it is determined whether or not the sounding is carried out (S108). If the sounding is not carried out, then the process goes back to the step S103. It should be noted that the process may go back to the step S106 if the same combination of terminals are continued to be used.

When the sounding is carried out, the process goes back to the step S102. For example, when the sounding is periodically carried out at a predetermined interval, whether or not the timing to carry out the sounding has arrived is determined. Alternatively, the decision to carry out the sounding may be made by determining whether or not there exists any terminal whose SINR becomes lower than a threshold and determining to carry out the sounding when such a terminal exists. In this case, the sounding may only be carried out for the terminal whose SINR is lower than the threshold, or may be carried out for all the terminals that are candidates for which DL-MU-MIMO is carried out.

The terminals in this embodiment each have one single antenna, and the access point carries out DL-MU-MIMO transmission using one beam for each terminal. However, it is also possible to carry out transmission using multiple beams to terminals equipped with multiple antennas, in other words, to simultaneously transmit multiple frames. In the embodiments described in the foregoing, the spatial multiplexing number agrees with the number of multiplexing of the terminals (user multiplexing number). When a mode is considered according to which one antenna transmits multiple beams, the invention can be implemented in the similar manner by understanding the spatial multiplexing number as a total number of the beams of the terminals for which DL-MU-MIMO transmission is carried out.

As has been described in the foregoing, according to this embodiment, in the course of the DL-MU-MIMO-based user selection scheduling, it is not necessary to calculate the individual SINRs of the terminals for each of the combinations of terminals. With regard to the individual terminals, the SINRs can be identified independently of the combinations of terminals and thus the transmission rate can be determined. Accordingly, when compared with the state of the art, the amount of calculation of the scheduling can be reduced and the processing time required in the scheduling can be shortened.

Second Embodiment

Figure 20:
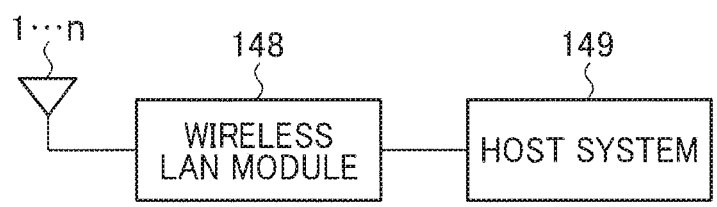
FIG. 20 is a diagram showing an exemplary entire configuration of a terminal or access point.

FIG. 20 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the above any embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external devices according to an arbitrary communication protocol. The communication protocol may include the TCP/IP and a protocol of a layer upper than that. Alternatively, the TCP/IP may be mounted on the wireless LAN module 148, and the host system 149 may execute only a protocol in a layer upper than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device and so on.

Figure 21:
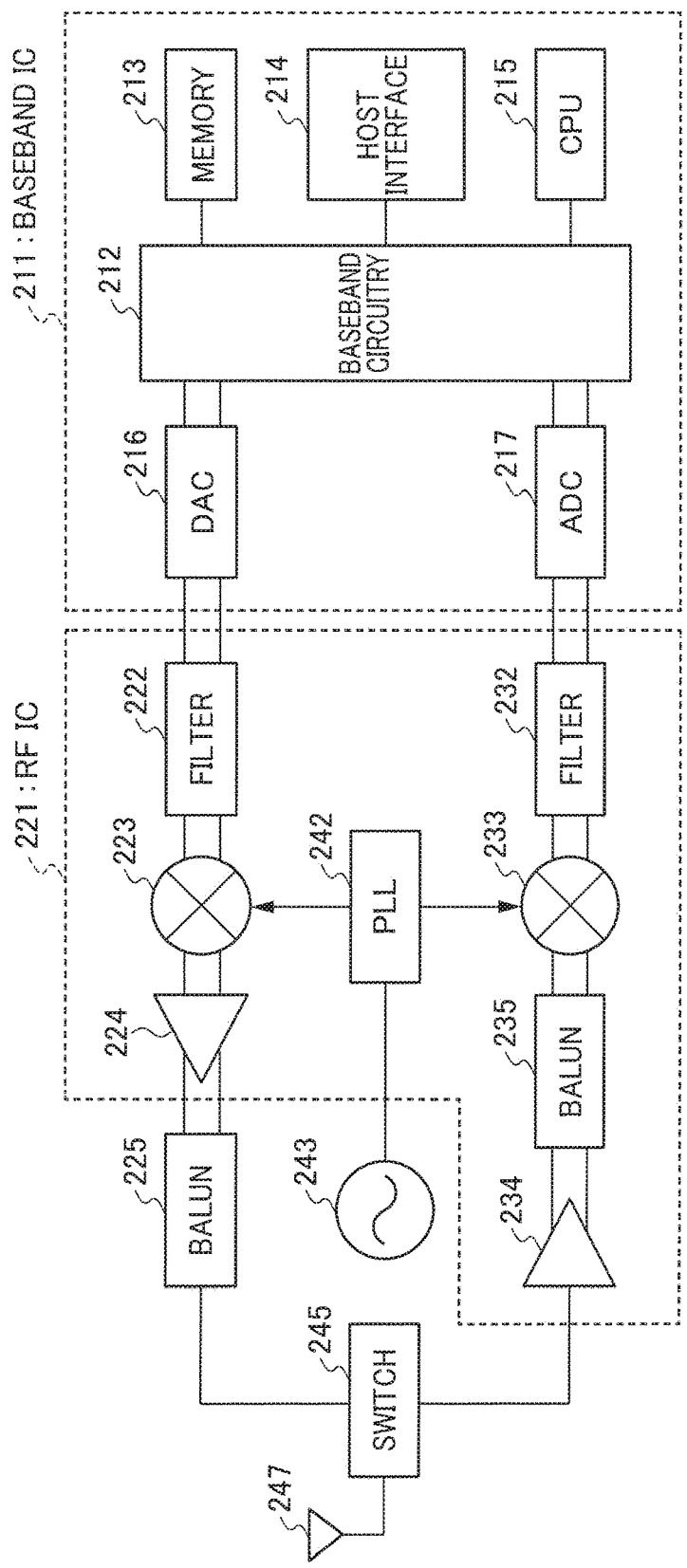
FIG. 21 is a diagram showing an exemplary hardware configuration of a wireless communication device installed at an access point or terminal according to a third embodiment.

FIG. 21 shows an example of hardware configuration of a wireless LAN module. The configuration can also be applied when the wireless communication device (or a wireless device) is mounted on either one of the terminal that is a non-base station and the base station (access point). That is, the configuration can be employed as a configuration example of the wireless communication device in FIG. 1. In the drawing, one antenna is shown by reference numeral 247 although the access point may provide two or more antennas. In case of a plurality of antennas, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. The PLL 242 or the crystal oscillator 243 or both of them corresponds to an oscillator according to an embodiment.

The wireless LAN module (wireless communication device or wireless device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM and a DRAM, or may be a non-volatile memory, such as a NAND and an MRAM.

The host interface 214 is an interface for connection to the host system. The interface can be anything, such as UART, SPI, SDIO, USB, and PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control device that controls communication or the controller that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

Figure 22:
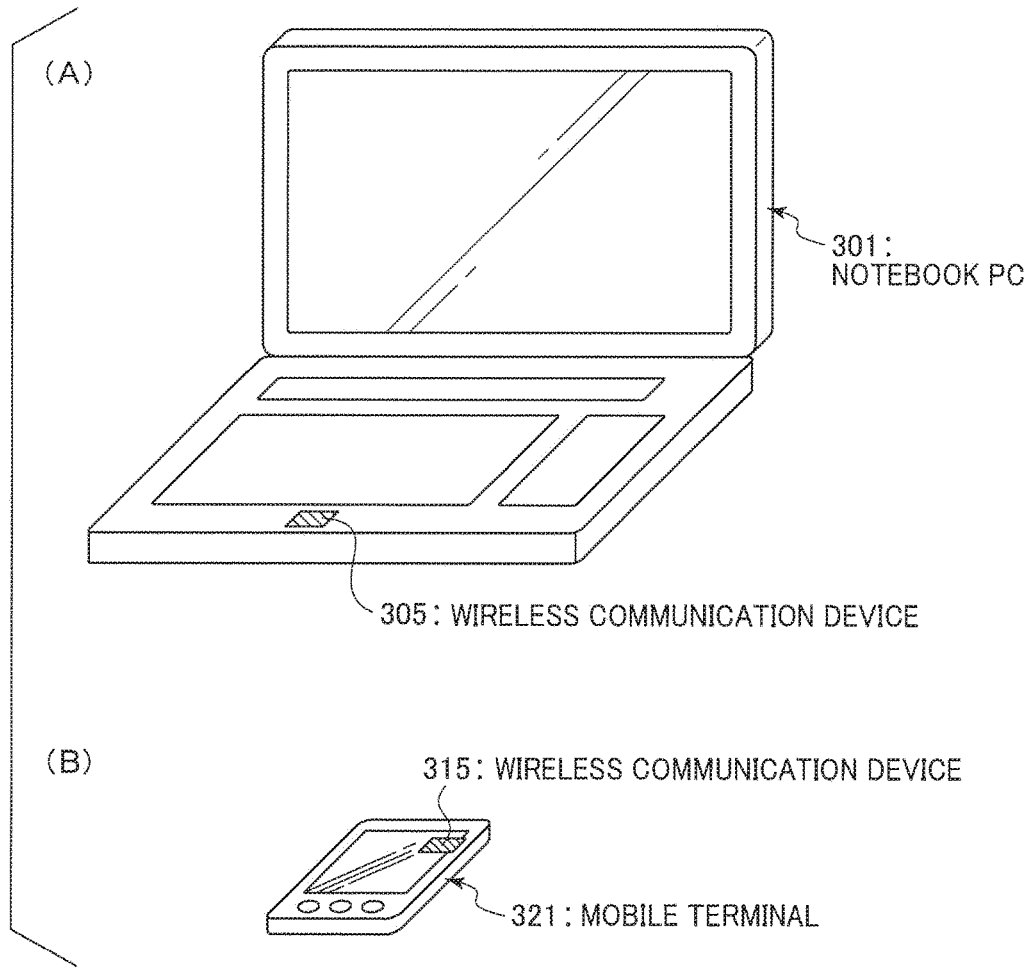
FIG. 22 shows perspective views of a terminal according to a third embodiment.

In a case that the module of FIG. 22 is an access point, the switch 245 controls the directivities of the antennas 1 to n according to an instruction signal of the baseband IC 211, the baseband circuit 212 or the CPU 215. For example, each antenna has a plurality of branches, and the switches controls an impedance or a resistance of each of branches in each antenna to control the directivity of each antenna.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

Third Embodiment

FIG. 22(A) and FIG. 22(B) are perspective views of wireless terminal according to the third embodiment. The wireless terminal in FIG. 22(A) is a notebook PC 301 and the wireless communication device (or a wireless device) in FIG. 22(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/ service provider access point, a portable device, a handheld device, a vehicle and so on.

Figure 23:
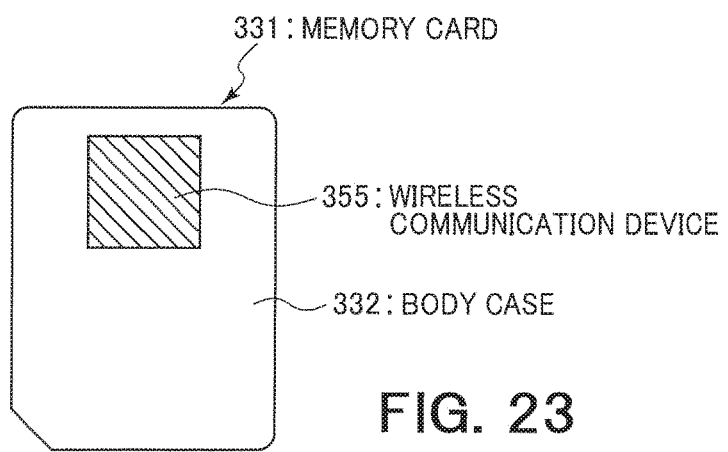
FIG. 23 is a diagram showing a memory card according to the third embodiment.

Moreover, a wireless communication device installed in a terminal (which may indicate a base station) can also be provided in a memory card. FIG. 23 illustrates an example of a wireless communication device mounted on a memory card. A memory card 331 contains a wireless communication device 355 and a body case 332. The memory card 331 uses the wireless communication device 355 for wireless communication with external devices. Here, in FIG. 23, the description of other installed elements (for example, a memory, and so on) in the memory card 331 is omitted.

Fourth Embodiment

In the fourth embodiment, a bus, a processor unit and an external interface unit are provided in addition to the configuration of the wireless communication device of the terminal (which may indicate the base station) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Fifth Embodiment

In the fifth embodiment, a clock generating unit is provided in addition to the configuration of the wireless communication device of the terminal (which may indicate the base station) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Sixth Embodiment

In the sixth embodiment, a power source unit, a power source controlling unit and a wireless power feeding unit are included in addition to the configuration of the wireless communication device of the terminal (which may indicate the base station) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Seventh Embodiment

In the seventh embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

Eighth Embodiment

In the eighth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Ninth Embodiment

In the ninth embodiment, an LED unit is added to the configuration of the wireless communication device of the terminal (which may indicate the base station) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

Tenth Embodiment

In the tenth embodiment, a vibrator unit is included in addition to the configuration of the wireless communication device wireless communication device of the terminal (which may indicate the base station) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

Eleventh Embodiment

In the eleventh embodiment, the configuration of the wireless communication device includes a display in addition to the configuration of the wireless communication device (the wireless communication device of the terminal (which may indicate the base station) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

Twelfth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are successfully shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection, there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. The frame for disconnection may be referred to as "release frame" by the meaning of releasing connection, for example. Normally, it is determined that the connection is disconnected at the timing of transmitting the release frame in a wireless communication device on the side to transmit the release frame and at the timing of receiving the release frame in a wireless communication device on the side to receive the release frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the release frame cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in the IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of the IEEE802.11 wireless LAN is described. There are several types of frame intervals used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in the IEEE802.11 wireless LAN, and a strict period from a previous frame is not discussed. Therefore, the definition is followed in the explanation of the IEEE802.11 wireless LAN system. In the IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 24:
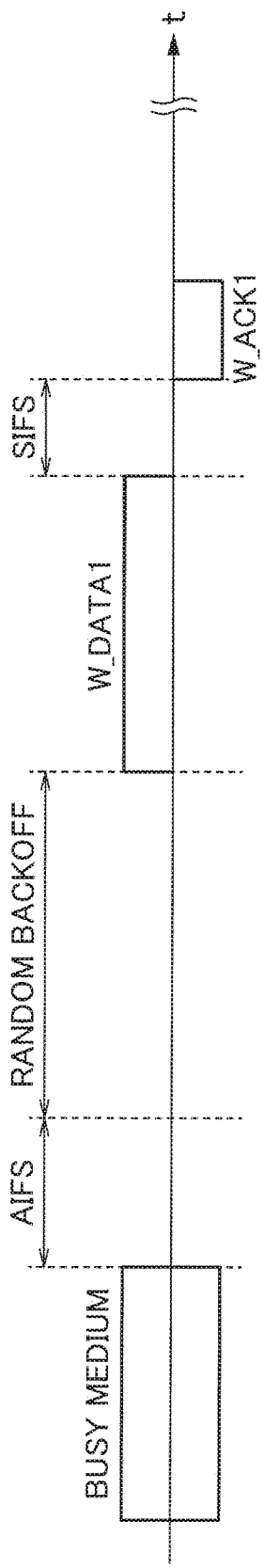
FIG. 24 is a diagram showing an example of frame exchange during a contention period.

Here, FIG. 24 illustrates one example of frame exchange in a competitive period based on the random access in the IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in the IEEE802.11 wireless LAN), the default values are defined.

For example, in the definition of 802.11ac, with an assumption that SIFS is 16 µs and the slot time is 9 µs, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS. In the present embodiment, a wireless communication system using parameters at such interframe spaces is assumed to be an interfering system with a wide communication range.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device comprising:
   a receiver configured to receive a first frame from a first terminal and a second frame from a second terminal; and
   controlling circuitry configured to
      obtain quality information of a first channel with the first terminal based on the first frame and quality information of a second channel with the second terminal based on the second frame, and
      determine a transmission rate applied to the first terminal and a transmission rate applied to the second terminal in spatially multiplexed transmission, based on the quality information of the first channel, the quality information of the second channel and interference amount information being indicative of an amount of interference depending on an execution condition of the spatially multiplexed transmission,
   wherein the execution condition of the spatially multiplexed transmission includes a channel aging time after acquisition of the quality information of the first or the second channel, and
   the interference amount indicated by the interference amount information takes a larger value as the channel aging time becomes longer.

2. The wireless communication device according to claim 1, wherein the receiver is configured to receive a third frame to an nth frame from a third terminal to an nth terminal, and the controlling circuitry is configured to
   obtain quality information of a third channel with the third terminal to quality information of an nth channel with the nth terminal,
   calculate first to nth transmission rates applicable to the first terminal to the nth terminal based on the quality information of the first to the nth channels and the interference amount information,
   calculate transmission time lengths necessary for transmitting frames to the first to nth terminals based on the first to the nth transmission rates and sizes of the frames transmitted to the first to the nth terminals, and
   select a plurality of terminals targeted for the spatially multiplexed transmission from among the first to the nth terminals based on proximity of the transmission time lengths of the frames transmitted to the first to the nth terminals.

3. The wireless communication device according to claim 2, wherein the controlling circuitry is configured to
   identify a terminal to which the frame needs to be most preferentially transmitted among the first to the nth terminals, and
   select at least one another terminal other than the identified terminal from among the first to the nth terminals based on proximity of the transmission time length with respect to that of the identified terminal,
   wherein the identified terminal and the selected at least one another terminal corresponds to a plurality of terminals targeted for the spatially multiplexed transmission.

4. The wireless communication device according to claim 1, wherein the controlling circuitry is configured to
   calculate a communication quality value based on a difference between the quality information of the first or the second channel and the interference amount information, and
   calculate the transmission rate of the first or the second terminal higher as the communication quality value becomes larger.

5. The wireless communication device according to claim 1, wherein the interference amount information indicates an average value of either simulation values or actual measurement values for inter-terminal interference amounts of respective terminals in a plurality of terminal combinations.

6. The wireless communication device according to claim 1, comprising at least one antenna.

7. A wireless communication method comprising:
   receiving a first frame from a first terminal and a second frame from a second terminal;
   obtaining quality information of a first channel with the first terminal based on the first frame and quality information of a second channel with the second terminal based on the second frame; and
   determining a transmission rate applied to the first terminal and a transmission rate applied to the second terminal in spatially multiplexed transmission, based on the quality information of the first channel, the quality information of the second channel and interference amount information being indicative of an amount of interference depending on an execution condition of the spatially multiplexed transmission, wherein the execution condition of the spatially multiplexed transmission is a channel aging time after acquisition of the Quality information of the first or the second channel, and the interference amount indicated by the interference amount information takes a larger value as the channel aging time becomes longer.

8. The wireless communication method according to claim 7, comprising:
receiving a third frame to an nth frame from a third terminal to an nth terminal,
obtaining quality information of a third channel with the third terminal to quality information of an nth channel with the nth terminal,
calculating first to nth transmission rates applicable to the first terminal to the nth terminal based on the quality information of the first to the nth channels and the interference amount information,
calculating transmission time lengths necessary for transmitting frames to the first to nth terminals based on the first to the nth transmission rates and sizes of the frames transmitted to the first to the nth terminals, and
selecting a plurality of terminals targeted for the spatially multiplexed transmission from among the first to the nth terminals based on proximity of the transmission time lengths of the frames transmitted to the first to the nth terminals.

9. The wireless communication method according to claim 8, comprising:
identifying a terminal to which the frame needs to be most preferentially transmitted among the first to the nth terminals, and
selecting at least one another terminal other than the identified terminal from among the first to the nth terminals based on proximity of the transmission time length with respect to that of the identified terminal,
wherein the identified terminal and the selected at least one another terminal correspond to a plurality of terminals targeted for the spatially multiplexed transmission.

10. The wireless communication method according to claim 7, comprising:
calculating a communication quality value based on a difference between the quality information of the first or the second channel and the interference amount information, and
calculating the transmission rate of the first or the second terminal higher as the communication quality value becomes larger.

11. The wireless communication method according to claim 7, wherein the interference amount information indicates an average value of either simulation values or actual measurement values for inter-terminal interference amounts of respective terminals in a plurality of terminal combinations.

12. A wireless communication device comprising:
a receiver configured to receive a first frame from a first terminal and a second frame from a second terminal; and
controlling circuitry configured to
obtain quality information of a first channel with the first terminal based on the first frame and quality information of a second channel with the second terminal based on the second frame, and
determine a transmission rate applied to the first terminal and a transmission rate applied to the second terminal in spatially multiplexed transmission, based on the quality information of the first channel, the quality information of the second channel and interference amount information being indicative of an amount of interference depending on an execution condition of the spatially multiplexed transmission,
wherein the receiver is configured to receive a third frame to an nth frame from a third terminal to an nth terminal, and
the controlling circuitry is configured to
obtain quality information of a third channel with the third terminal to quality information of an nth channel with the nth terminal,
calculate first to nth transmission rates applicable to the first terminal to the nth terminal based on the quality information of the first to the nth channels and the interference amount information,
calculate transmission time lengths necessary for transmitting frames to the first to nth terminals based on the first to the nth transmission rates and sizes of the frames transmitted to the first to the nth terminals, and
select a plurality of terminals targeted for the spatially multiplexed transmission from among the first to the nth terminals based on proximity of the transmission time lengths of the frames transmitted to the first to the nth terminals.

* * * * *